(12) United States Patent
Kimes et al.

(10) Patent No.: US 10,677,296 B2
(45) Date of Patent: Jun. 9, 2020

(54) ELECTRONIC, HIGH-EFFICIENCY VEHICULAR TRANSMISSION, OVERRUNNING, NON-FRICTION COUPLING AND CONTROL ASSEMBLY AND SWITCHABLE LINEAR ACTUATOR DEVICE FOR USE THEREIN

(71) Applicant: Means Industries, Inc., Saginaw, MI (US)

(72) Inventors: John W. Kimes, Wayne, MI (US); Patrick J. McCleer, Jackson, MI (US)

(73) Assignee: Means Industries, Inc., Saginaw, MI (US)

( * ) Notice: Subject to any disclaimer, the term of this patent is extended or adjusted under 35 U.S.C. 154(b) by 357 days.

(21) Appl. No.: 15/835,884

(22) Filed: Dec. 8, 2017

(65) Prior Publication Data
US 2018/0106304 A1 Apr. 19, 2018

Related U.S. Application Data

(60) Continuation-in-part of application No. 14/487,234, filed on Sep. 16, 2014, now Pat. No. 9,435,387, and
(Continued)

(51) Int. Cl.
*F16D 23/02* (2006.01)
*B60K 6/48* (2007.10)
(Continued)

(52) U.S. Cl.
CPC ............ *F16D 41/125* (2013.01); *B60K 6/387* (2013.01); *B60K 6/48* (2013.01); *B60K 6/547* (2013.01);
(Continued)

(58) Field of Classification Search
CPC .................... F16H 2061/0422; F16H 61/0403
See application file for complete search history.

(56) References Cited

U.S. PATENT DOCUMENTS 2,866,109 A 12/1958 Watson
2,947,537 A 8/1960 Littell et al.
(Continued)

FOREIGN PATENT DOCUMENTS

GB 1007475 A 10/1965

OTHER PUBLICATIONS

International Search Report and Written Opinion, International application No. PCT/US2011/036636; dated Aug. 26, 2011.
(Continued)

*Primary Examiner* — Terence Boes
(74) *Attorney, Agent, or Firm* — Brooks Kushman P.C.

(57) ABSTRACT

An electronic, high-efficiency vehicular transmission, an overrunning, non-friction coupling and control assembly and switchable linear actuator device for use in the assembly and the transmission are provided. The device controls the operating mode of at least one non-friction coupling assembly. The device has a plurality of magnetic sources which produce corresponding magnetic fields to create a net translational force. The net translational force comprises a first translational force caused by energization of at least one electromagnetic source and a magnetic latching force based upon linear position of a permanent magnet source along an axis.

12 Claims, 16 Drawing Sheets

Related U.S. Application Data a division of application No. 14/487,322, filed on Sep. 16, 2014, now Pat. No. 9,874,252, said application No. 14/487,234 is a continuation-in-part of application No. 13/370,507, filed on Feb. 10, 2012, now Pat. No. 9,303,699, which is a continuation-in-part of application No. 13/218,817, filed on Aug. 26, 2011, now Pat. No. 8,888,637, which is a continuation-in-part of application No. PCT/US2011/036636, filed on May 16, 2011.

(60) Provisional application No. 61/882,694, filed on Sep. 26, 2013, provisional application No. 61/421,868, filed on Dec. 10, 2010.

(51) Int. Cl.
  *B60K 6/387* (2007.10)
  *F16D 27/108* (2006.01)
  *F16D 41/12* (2006.01)
  *F16H 63/30* (2006.01)
  *F16H 61/04* (2006.01)
  *B60K 6/547* (2007.10)
  *F16D 27/118* (2006.01)
  *F16D 27/00* (2006.01)
  *F16H 3/00* (2006.01)
  *F16D 23/06* (2006.01)
  *F16D 11/14* (2006.01)
  *B60K 6/54* (2007.10)

(52) U.S. Cl.
  CPC ........... *F16D 23/02* (2013.01); *F16D 27/108* (2013.01); *F16H 61/0403* (2013.01); *F16H 63/304* (2013.01); *B60K 2006/4816* (2013.01); *B60K 2006/541* (2013.01); *B60Y 2200/92* (2013.01); *F16D 11/14* (2013.01); *F16D 23/0606* (2013.01); *F16D 27/004* (2013.01); *F16D 27/118* (2013.01); *F16H 3/006* (2013.01); *F16H 2061/0433* (2013.01); *F16H 2061/0474* (2013.01); *F16H 2063/305* (2013.01); *F16H 2063/3053* (2013.01); *F16H 2200/0052* (2013.01); *Y10T 74/19251* (2015.01)

(56) References Cited

U.S. PATENT DOCUMENTS

| | | |
|---|---|---|
| 2,959,062 A | 11/1960 | Looker |
| 2,960,287 A | 11/1960 | Barlow |
| 2,966,975 A | 1/1961 | Wiedmann et al. |
| 2,969,134 A | 1/1961 | Wiedmann et al. |
| 3,130,989 A | 4/1964 | Lannen |
| 4,050,560 A | 9/1977 | Torstenfelt |
| 4,340,133 A | 7/1982 | Blersch |
| 4,651,847 A | 3/1987 | Hermanns |
| 5,052,534 A | 10/1991 | Gustin et al. |
| 5,070,978 A | 12/1991 | Pires |
| 5,206,573 A | 4/1993 | McCleer et al. |
| 5,231,265 A | 7/1993 | Hackett et al. |
| 5,342,258 A | 8/1994 | Egyed |
| 5,362,293 A | 11/1994 | Romanauskas |
| 5,387,854 A | 2/1995 | McCleer et al. |
| 5,394,321 A | 2/1995 | McCleer et al. |
| 5,453,598 A | 9/1995 | Hackett et al. |
| 5,597,057 A | 1/1997 | Ruth et al. |
| 5,638,929 A | 6/1997 | Park |
| 5,642,009 A | 6/1997 | McCleer et al. |
| 5,678,668 A | 10/1997 | Sink |
| 5,827,148 A | 10/1998 | Seto |
| 5,846,257 A | 12/1998 | Hood |
| 5,847,469 A | 12/1998 | Tabata et al. |
| 5,856,709 A | 1/1999 | Ibaraki et al. |
| 5,918,715 A | 7/1999 | Ruth et al. |
| 5,924,510 A | 7/1999 | Itoh et al. |
| 5,927,455 A | 7/1999 | Baker et al. |
| 6,019,699 A | 2/2000 | Hoshiya et al. |
| 6,065,576 A | 5/2000 | Shaw et al. |
| 6,075,302 A | 6/2000 | McCleer |
| 6,193,038 B1 | 2/2001 | Scott et al. |
| 6,237,931 B1 | 5/2001 | Marola |
| 6,244,965 B1 | 6/2001 | Klecker et al. |
| 6,290,044 B1 | 9/2001 | Burgman et al. |
| 6,306,057 B1 | 10/2001 | Morisawa et al. |
| 6,328,670 B1 | 12/2001 | Minowa et al. |
| 6,344,008 B1 | 2/2002 | Nagano et al. |
| 6,503,167 B1 | 1/2003 | Sturm |
| 6,692,405 B2 | 2/2004 | Minowa et al. |
| 6,814,201 B2 | 11/2004 | Thomas |
| 6,846,257 B2 | 1/2005 | Baker et al. |
| 6,905,009 B2 | 6/2005 | Reed et al. |
| 6,953,409 B2 | 10/2005 | Schmidt et al. |
| 6,982,502 B1 | 1/2006 | Sendaula et al. |
| 7,093,512 B2 | 8/2006 | Ibamoto et al. |
| 7,153,228 B2 | 12/2006 | Fujiu et al. |
| 7,198,587 B2 | 4/2007 | Samie et al. |
| 7,201,690 B2 | 4/2007 | Miura et al. |
| 7,223,198 B2 | 5/2007 | Kimes et al. |
| 7,223,200 B2 | 5/2007 | Kojima et al. |
| 7,255,186 B2 | 8/2007 | Wakuta et al. |
| 7,256,510 B2 | 8/2007 | Holmes et al. |
| 7,258,214 B2 | 8/2007 | Pawley et al. |
| 7,275,628 B2 | 10/2007 | Pawley et al. |
| 7,344,010 B2 | 3/2008 | Fetting, Jr. et al. |
| 7,349,010 B2 | 3/2008 | Bryant et al. |
| 7,393,296 B2 | 7/2008 | Kano et al. |
| 7,397,296 B1 | 7/2008 | Kiani |
| 7,426,971 B2 | 9/2008 | Kano et al. |
| 7,464,801 B2 | 12/2008 | Wittkopp |
| 7,484,605 B2 | 2/2009 | Pawley et al. |
| 7,491,151 B2 | 2/2009 | Maguire et al. |
| 7,614,466 B2 | 11/2009 | Kano et al. |
| 7,621,359 B2 | 11/2009 | Kano et al. |
| 7,690,455 B2 | 4/2010 | Kano et al. |
| 7,695,387 B2 | 4/2010 | Oba |
| 7,743,678 B2 | 6/2010 | Wittkopp et al. |
| 7,806,795 B2 | 10/2010 | Oba et al. |
| 7,942,781 B2 | 5/2011 | Kimes |
| 7,992,695 B2 | 8/2011 | Wittkopp et al. |
| 8,051,959 B2 | 11/2011 | Eisengruber |
| 8,061,496 B2 | 11/2011 | Samie et al. |
| 8,079,453 B2 | 12/2011 | Kimes |
| 8,286,772 B2 | 10/2012 | Eisengruber |
| 8,740,748 B2 * | 6/2014 | Moorman ........... F16H 61/0403 192/3.58 |
| 9,303,699 B2 | 4/2016 | Kimes |
| 10,272,765 B1 * | 4/2019 | Cho ..................... F16H 37/046 |
| 2004/0069082 A1 * | 4/2004 | Koenig ............... F16H 61/2807 74/335 |
| 2004/0110594 A1 | 6/2004 | Goto |
| 2004/0159517 A1 | 8/2004 | Thomas |
| 2004/0238306 A1 | 12/2004 | Reed et al. |
| 2006/0048594 A1 * | 3/2006 | Gumpoltsberger ..... F16H 3/006 74/331 |
| 2006/0138777 A1 | 6/2006 | Hofbauer et al. |
| 2006/0185957 A1 | 8/2006 | Kimes et al. |
| 2006/0252589 A1 | 11/2006 | Tay |
| 2006/0278487 A1 | 12/2006 | Pawley et al. |
| 2007/0034470 A1 | 2/2007 | Fetting, Jr. et al. |
| 2007/0056825 A1 | 3/2007 | Fetting, Jr. et al. |
| 2007/0107960 A1 | 5/2007 | Takami et al. |
| 2007/0278061 A1 | 12/2007 | Wittkopp et al. |
| 2008/0093190 A1 | 4/2008 | Belmont |
| 2008/0110715 A1 | 5/2008 | Pawley |
| 2008/0169165 A1 | 7/2008 | Samie et al. |
| 2008/0169166 A1 | 7/2008 | Wittkopp et al. |
| 2008/0185253 A1 | 8/2008 | Kimes |
| 2008/0223681 A1 | 9/2008 | Stevenson et al. |
| 2008/0245360 A1 | 10/2008 | Almy et al. |
| 2008/0277891 A1 | 11/2008 | Adams, III et al. |

(56) References Cited

U.S. PATENT DOCUMENTS

| | | | |
|---|---|---|---|
| 2009/0038424 A1* | 2/2009 | Schneider | B60W 30/18054 |
| | | | 74/335 |
| 2009/0084653 A1 | 4/2009 | Holmes | |
| 2009/0098968 A1 | 4/2009 | Maguire et al. | |
| 2009/0098970 A1 | 4/2009 | Kimes | |
| 2009/0127059 A1 | 5/2009 | Knoblauch | |
| 2009/0133981 A1 | 5/2009 | Tarasinski et al. | |
| 2009/0142207 A1 | 6/2009 | Ring et al. | |
| 2009/0159391 A1 | 6/2009 | Eisengruber | |
| 2009/0194381 A1 | 8/2009 | Samie et al. | |
| 2009/0211863 A1 | 8/2009 | Kimes | |
| 2009/0255773 A1 | 10/2009 | Seufert et al. | |
| 2010/0044141 A1 | 2/2010 | Kimes et al. | |
| 2010/0071497 A1 | 3/2010 | Reisch et al. | |
| 2010/0113217 A1* | 5/2010 | Terwart | F16H 61/0403 |
| | | | 477/79 |
| 2010/0119389 A1 | 5/2010 | Lazebnik et al. | |
| 2010/0200358 A1 | 8/2010 | Eisengruber et al. | |
| 2010/0230226 A1 | 9/2010 | Prout | |
| 2010/0252384 A1 | 10/2010 | Eisengruber | |
| 2011/0073393 A1* | 3/2011 | Sasaki | B60K 6/387 |
| | | | 180/65.22 |
| 2011/0140451 A1 | 6/2011 | Sharples et al. | |
| 2011/0177900 A1 | 7/2011 | Simon | |
| 2011/0183806 A1 | 7/2011 | Wittkopp et al. | |
| 2011/0192697 A1 | 8/2011 | Prout et al. | |
| 2011/0215575 A1 | 9/2011 | Hofbauer et al. | |
| 2011/0233026 A1 | 9/2011 | Pawley | |
| 2012/0145506 A1 | 6/2012 | Samie et al. | |
| 2012/0152683 A1 | 6/2012 | Kimes | |
| 2012/0152687 A1 | 6/2012 | Kimes et al. | |
| 2015/0000442 A1* | 1/2015 | Kimes | F16D 23/02 |
| | | | 74/335 |
| 2015/0226289 A1* | 8/2015 | Klingston | B60L 50/16 |
| | | | 74/661 |

OTHER PUBLICATIONS

International Search Report and Written Opinion, International application No. PCT/US2011/036634; dated Aug. 25, 2011.
International Search Report and Written Opinion, International application No. PCT/US2012/025046; dated May 21, 2012.
International Search Report and Written Opinion, International application No. PCT/US2012/050742; dated Nov. 20, 2012.
International Search Report and Written Opinion, International application No. PCT/US2012/50749; dated Dec. 11, 2012.
International Preliminary Report on Patentability; International application No. PCT/US2012/025046; dated Aug. 21, 2013.
International Preliminary Report on Patentability; International application No. PCT/US2012/050749; dated Mar. 4, 2014.
International Preliminary Report on Patentability; International application No. PCT/US2012/050742; dated Mar. 4, 2014.
International Preliminary Report on Patentability; International application No. PCT/US2012/050753; dated Mar. 25, 2014.
Office Action; U.S. Appl. No. 13/370,507; dated Aug. 27, 2014.

* cited by examiner

ELECTRONIC, HIGH-EFFICIENCY VEHICULAR TRANSMISSION, OVERRUNNING, NON-FRICTION COUPLING AND CONTROL ASSEMBLY AND SWITCHABLE LINEAR ACTUATOR DEVICE FOR USE THEREIN

CROSS-REFERENCE TO RELATED APPLICATIONS

This application is a divisional of U.S. application Ser. No. 14/487,322 filed Sep. 16, 2014 which claims the benefit of U.S. provisional patent application Ser. No. 61/882,694 filed Sep. 26, 2013 and is a continuation-in-part of U.S. application Ser. No. 14/487,234 filed Sep. 16, 2014 which also claims the benefit of that provisional patent application. This application is also a continuation-in-part of U.S. patent application Ser. No. 13/370,507 filed Feb. 10, 2012. That application is a continuation-in-part of U.S. patent application Ser. No. 13/218,817 filed Aug. 26, 2011 which, in turn, is a continuation-in-part of U.S. national phase PCT Application No. PCT/US11/36636 filed May 16, 2011 which claims the benefit of U.S. provisional patent application No. 61/421,868 filed Dec. 10, 2010.

TECHNICAL FIELD

This invention relates to:
1) switchable linear actuator devices to control the operating mode of one or more non-friction coupling assemblies;
2) overrunning, non-friction coupling and control assemblies;
3) reciprocating electromechanical apparatus for controlling the operating modes of parts of non-friction coupling assemblies; and
4) electronic, high-efficiency vehicular transmissions.

Overview

A dual-clutch transmission, (DCT) (sometimes referred to as a twin-clutch gearbox or double-clutch transmission), is a type of semi-automatic or automated manual automotive transmission. Referring to FIG. 1, dual clutch arrangements for dual clutch transmissions are commonly known. In a dual clutch transmission the gears are divided between two parallel gear trains, in such a way that the odd gears (and reverse) are assigned to one gear train and the even gears to the other gear train. A separate friction clutch is furthermore assigned to the input side of each gear train. The two friction clutches form a dual clutch arrangement, which is arranged between an engine (usually an internal combustion engine) and the dual clutch transmission.

When a gear is engaged in one gear train and the associated friction clutch is closed, an adjacent gear may already be engaged in the other gear train. On disengagement and opening of the friction clutch for the original gear, the friction clutch for the target gear is closed with a degree of overlap, so that a gear change can take place with no interruption in tractive force as shown in FIG. 2.

A typical multi-speed, dual clutch transmission uses a combination of two friction clutches and several dog clutch synchronizers as shown in FIG. 1 to achieve "continuous torque" or dynamic shifts by alternating between one friction clutch and the other, with the synchronizers being "pre-selected" for the oncoming ratio prior to actually making the dynamic shift. "Continuous torque" shifting means that torque flow from the engine need not be interrupted prior to making the shift. This concept typically uses countershaft gears with a different, dedicated gear pair or set to achieve each forward speed ratio. Typically an electronically controlled hydraulic control circuit or system is employed to control solenoids and valve assemblies. The solenoid and valve assemblies actuate clutches and synchronizers to achieve the forward and reverse gear ratios.

DCT's offer substantial efficiencies by eliminating the hydraulics in a transmission. The result is large reductions in parasitic losses and substantial fuel economy improvements. However, the fuel economy benefits are often muted by:
 Drivability issues—launch shudder, sustained creep, parking lot maneuvers, rock cycling, clutch to clutch shifts, roll back
 NVH Issues
 Cost—Electro-mechanical systems (4 motors) just for shifting function, expensive gears
 Reliability/Durability—Complexity of systems like the MAM, synchronizers, and friction materials.

U.S. Pat. No. 7,942,781 discloses a high-efficiency vehicular transmission. The transmission includes a transmission housing, a set of torque delivery elements which include first and second elements supported for rotation within the housing and an electric motor for changing angular velocity of at least one of the elements in response to an electrical signal during a shift to obtain a desired transmission ratio. At least one non-friction controllable coupling assembly has a coupling state for coupling the first element to either the second element or the housing and an uncoupling state for uncoupling the first element from either the second element or the housing, respectively. The at least one coupling assembly is non-hydraulically controlled to change state to maintain the desired transmission ratio.

A typical one-way clutch (OWC) consists of an inner ring, an outer ring and a locking device between the two rings. The one-way clutch is designed to lock in one direction and to allow free rotation in the other direction. Two types of one-way clutches often used in vehicular, automatic transmissions include:
 Roller type which consists of spring loaded rollers between the inner and outer race of the one-way clutch. (Roller type is also used without springs on some applications); and
 Sprag type which consists of asymmetrically shaped wedges located between the inner and outer race of the one-way clutch.

The one-way clutches are typically used in the transmission to prevent an interruption of drive torque (i.e., power flow) during certain gear shifts and to allow engine braking during coasting.

Controllable or selectable one-way clutches (i.e., OWCs) are a departure from traditional one-way clutch designs. Selectable OWCs add a second set of locking members in combination with a slide plate. The additional set of locking members plus the slide plate adds multiple functions to the OWC. Depending on the needs of the design, controllable OWCs are capable of producing a mechanical connection between rotating or stationary shafts in one or both directions. Also, depending on the design, OWCs are capable of overrunning in one or both directions. A controllable OWC contains an externally controlled selection or control mechanism. Movement of this selection mechanism can be between two or more positions which correspond to different operating modes.

U.S. Pat. No. 5,927,455 discloses a bi-directional overrunning pawl-type clutch, U.S. Pat. No. 6,244,965 discloses a planar overrunning coupling, and U.S. Pat. No. 6,290,044 discloses a selectable one-way clutch assembly for use in an automatic transmission.

U.S. Pat. Nos. 7,258,214 and 7,344,010 disclose overrunning coupling assemblies, and U.S. Pat. No. 7,484,605 discloses an overrunning radial coupling assembly or clutch.

A properly designed controllable OWC can have near-zero parasitic losses in the "off" state. It can also be activated by electro-mechanics and does not have either the complexity or parasitic losses of a hydraulic pump and valves.

Other related U.S. patent publications include: 2011/0140451; 2011/0215575; 2011/0233026; 2011/0177900; 2010/0044141; 2010/0071497; 2010/0119389; 2010/0252384; 2009/0133981; 2009/0127059; 2009/0084653; 2009/0194381; 2009/0142207; 2009/0255773; 2009/0098968; 2010/0230226; 2010/0200358; 2009/0211863; 2009/0159391; 2009/0098970; 2008/0223681; 2008/0110715; 2008/0169166; 2008/0169165; 2008/0185253; 2007/0278061; 2007/0056825; 2006/0252589; 2006/0278487; 2006/0138777; 2006/0185957; 2004/0110594; and the following U.S. Pat. Nos. 7,942,781; 7,806,795; 7,695,387; 7,690,455; 7,491,151; 7,484,605; 7,464,801; 7,349,010; 7,275,628; 7,256,510; 7,223,198; 7,198,587; 7,093,512; 6,953,409; 6,846,257; 6,814,201; 6,503,167; 6,328,670; 6,692,405; 6,193,038; 4,050,560; 4,340,133; 5,597,057; 5,918,715; 5,638,929; 5,342,258; 5,362,293; 5,678,668; 5,070,978; 5,052,534; 5,387,854; 5,231,265; 5,394,321; 5,206,573; 5,453,598; 5,642,009; 6,075,302; 6,065,576; 6,982,502; 7,153,228; 5,846,257; 5,924,510; and 5,918,715.

A linear motor is an electric motor that has had its stator and rotor "unrolled" so that instead of producing a torque (rotation) it produces a linear force along its length. The most common mode of operation is as a Lorentz-type actuator, in which the applied force is linearly proportional to the current and the magnetic field. U.S. published application 2003/0102196 discloses a bi-directional linear motor.

Linear stepper motors are used for positioning applications requiring rapid acceleration and high speed moves with low mass payloads. Mechanical simplicity and precise open look operation are additional features of stepper linear motor systems.

A linear stepper motor operates on the same electromagnetic principles as a rotary stepper motor. The stationary part or platen is a passive toothed steel bar extending over the desired length of travel. Permanent magnets, electro-magnets with teeth, and bearings are incorporated into the moving elements or forcer. The forcer moves bi-directionally along the platen, assuring discrete locations in response to the state of the currents in the field windings. In general, the motor is two-phase, however a larger number of phases can be employed.

The linear stepper motor is well known in the prior art and operates upon established principles of magnetic theory. The stator or platen component of the linear stepper motor consists of an elongated, rectangular steel bar having a plurality of parallel teeth that extends over the distance to be traversed and functions in the manner of a track for the so-called forcer component of the motor.

The platen is entirely passive during operation of the motor and all magnets and electromagnets are incorporated into the forcer or armature component. The forcer moves bi-directionally along the platen assuming discrete locations in response to the state of the electrical current in its field windings.

Mechanical forces that are due to local or distant magnetic sources, i.e. electric currents and/or permanent magnet (PM) materials, can be determined by examination of the magnetic fields produced or "excited" by the magnetic sources. A magnetic field is a vector field indicating at any point in space the magnitude and direction of the influential capability of the local or remote magnetic sources. The strength or magnitude of the magnetic field at a point within any region of interest is dependent on the strength, the amount and the relative location of the exciting magnetic sources and the magnetic properties of the various mediums between the locations of the exciting sources and the given region of interest. By magnetic properties one means material characteristics that determine "how easy" it is to, or "how low" a level of excitation is required to, "magnetize" a unit volume of the material, that is, to establish a certain level of magnetic field strength. In general, regions which contain iron material are much easier to "magnetize" in comparison to regions which contain air or plastic material.

Magnetic fields can be represented or described as three dimensional lines of force, which are closed curves that traverse throughout regions of space and within material structures. When magnetic "action" (production of measurable levels of mechanical force) takes place within a magnetic structure these lines of force are seen to couple or link the magnetic sources within the structure. Lines of magnetic force are coupled/linked to a current source if they encircle all or a portion of the current path in the structure. Force lines are coupled/linked to a PM source if they traverse the PM material, generally in the direction or the anti-direction of the permanent magnetization. Individual lines of force or field lines, which do not cross one another, exhibit levels of tensile stress at every point along the line extent, much like the tensile force in a stretched "rubber band," stretched into the shape of the closed field line curve. This is the primary method of force production across air gaps in a magnetic machine structure.

One can generally determine the direction of net force production in portions of a magnetic machine by examining plots of magnetic field lines within the structure. The more field lines (i.e. the more stretched rubber bands) in any one direction across an air gap separating machine elements, the more "pulling" force between machine elements in that given direction.

Metal injection molding (MIM) is a metalworking process where finely-powdered metal is mixed with a measured amount of binder material to comprise a 'feedstock' capable of being handled by plastic processing equipment through a process known as injection mold forming. The molding process allows complex parts to be shaped in a single operation and in high volume. End products are commonly component items used in various industries and applications. The nature of MIM feedstock flow is defined by a physics called rheology. Current equipment capability requires processing to stay limited to products that can be molded using typical volumes of 100 grams or less per "shot" into the mold. Rheology does allow this "shot" to be distributed into multiple cavities, thus becoming cost-effective for small, intricate, high-volume products which would otherwise be quite expensive to produce by alternate or classic methods. The variety of metals capable of implementation within MIM feedstock are referred to as powder metallurgy, and these contain the same alloying constituents found in industry standards for common and exotic metal applications. Subsequent conditioning operations are performed on the molded shape, where the binder material is removed and the metal particles are coalesced into the desired state for the metal alloy.

A clevis fastener is a three-piece fastener system consisting of a clevis, clevis pin, and tang. The clevis is a U-shaped piece that has holes at the end of the prongs to accept the clevis pin. The clevis pin is similar to a bolt, but is only partially threaded or unthreaded with a cross-hole for a cotter pin. The tang is the piece that fits between the clevis and is held in place by the clevis pin. The combination of a simple clevis fitted with a pin is commonly called a shackle, although a clevis and pin is only one of the many forms a shackle may take.

Clevises are used in a wide variety of fasteners used in the farming equipment, sailboat rigging, as well as the automotive, aircraft and construction industries. They are also widely used to attach control surfaces and other accessories to servos in model aircraft. As a part of a fastener, a clevis provides a method of allowing rotation in some axes while restricting rotation in others.

For purposes of this application, the term "coupling" should be interpreted to include clutches or brakes wherein one of the plates is drivably connected to a torque delivery element of a transmission and the other plate is drivably connected to another torque delivery element or is anchored and held stationary with respect to a transmission housing. The terms "coupling," "clutch" and "brake" may be used interchangeably.

SUMMARY OF EXAMPLE EMBODIMENTS

An object of at least one embodiment of the present invention is to provide an electronic vehicular transmission which shifts quickly and quietly without the need for syncros, stepper motors, dog clutches, honed guide rods and cam drums of the prior art.

Another object of at least one embodiment of the present invention is to provide an overrunning, non-friction coupling and control assembly for use in the transmission and a switchable, linear actuator device for use in the assembly.

In carrying out the above objects and other objects of at least one embodiment of the present invention, a switchable, linear actuator device to control the operating mode of at least one non-friction coupling assembly is provided. The device has a plurality of magnetic sources which produce corresponding magnetic fields to create a net translational force. The device includes a stator structure including at least one electromagnetic source to create an electronically-switched magnetic field and a translator structure including a magnetically-latching, permanent magnet source magnetically coupled to the stator structure across a radial air gap and supported for translational movement relative to the stator structure along an axis between a plurality of predefined, discrete, axial positions which correspond to different operating modes of each coupling assembly. The translator structure translates along the axis between the different positions upon experiencing the net translational force comprising a first translational force caused by energization of the at least one electromagnetic source and a magnetic latching force based upon linear position of the permanent magnet source along the axis.

The structures may be substantially circularly symmetric. The permanent magnet source may comprise an annular magnet. The annular magnet may be a rare earth magnet. The annular magnet may be axially magnetized.

The translator structure may include a pair of field redirection rings wherein the annular magnet is sandwiched between the field redirection rings.

Each coupling assembly may be a clutch assembly.

Each electromagnetic source may include an annular slot and a coil disposed in the slot. Each slot opens to the radial air gap.

Further in carrying out the above objects and other objects of at least one embodiment of the present invention, a reciprocating electromechanical apparatus for controlling the operating modes of a pair of non-friction coupling assemblies is provided. The apparatus includes first and second members including first and second faces, respectively, in close-spaced opposition with one another. The second member is mounted for rotation about an axis and for reciprocating movement along the axis. Magnetic circuit components including first and second magnetic sources are provided. The first magnetic source is supported by the first member at the first face in close-spaced opposition to the second magnetic source which is supported by the second member. The magnetic sources are separated by a radial air gap. The second magnetic source is a magnetically-latching, permanent magnetic source having a permanent magnetic field and the first magnetic source is an electromagnetic source including a coil to create an electronically-switched magnetic field. A first connecting structure extends from the second member to connect the second member to a first locking element and a second connecting structure extends from the second member to connect the second member to a second locking element of a second coupling assembly to transfer the reciprocating movement to the second locking element. Coil energization creates a temporary magnetic field which causes the second member to reciprocate between first and second predefined, discrete positions along the axis. The permanent magnetic field cause the second member to maintain the first and second positions without the need to maintain coil energization thereby providing a magnetic latching effect.

The first face may be at least one recess in which the coil is located. Each recess may include an annular recess.

The permanent magnet source may be an annular magnet. Each of the coupling assemblies may be a clutch assembly.

The connecting structures may include a pair of biased connecting rods.

Still further in carrying out the above objects and other objects of at least one embodiment of the present invention, an overrunning, non-friction coupling and control assembly is provided. The assembly includes a first pair of coupling members supported for rotation relative to one another about a common rotational axis and a first locking member for selectively mechanically coupling the first pair of coupling members together to prevent relative rotation of the first pair of coupling members with respect to each other in at least one direction about the axis. The assembly also includes a second pair of coupling members supported for rotation relative to one another about the axis and a second locking member for selectively mechanically coupling the second pair of coupling members together to prevent relative rotation of the second pair of coupling members with respect to each other in at least one direction about the axis. The assembly further includes a stator subassembly having at least one coil to create an electromagnetically switched magnetic field and to create a magnetic flux when the at least one coil is energized. A magnetically-latching actuator subassembly includes first and second bi-directionally movable connecting structures. The first connecting structure is coupled to the first locking member and the second connecting structure is coupled to the second locking member for selective, small-displacement locking member movement. The actuator subassembly further includes a magnetic actuator coupled to the connecting structures and mounted for controlled reciprocating movement along the rotational axis relative to the first and second pair of coupling members between a first extended position which corresponds to a first mode of the first pair of coupling members and second extended positions which corresponds to a second mode of the second pairs of coupling members. The first connecting structure actuates the first locking member and the second connecting structure actuates the second locking member in the extended positions, respectively, so that the first locking member couples the first pair of coupling members for rotation with each other in at least one direction about the rotational axis and the second locking member couples the second pair of coupling members for rotation with each other in at least one direction about the rotational axis. The magnetic actuator completes a path of the magnetic flux to magnetically latch in the first and second extended positions. A control force caused by the magnetic flux is applied to linearly move the magnetic actuator between the first and second extended positions along the rotational axis.

The magnetic actuator may include a permanent magnet source.

The assembly may be an overrunning clutch and control assembly.

Yet still further in carrying out the objects and other objects of at least one embodiment of the present invention, an electronic, high-efficiency, vehicular transmission is provided. The transmission includes first and second input shafts and a transmission output shaft. A first group of forward gears is supported on the first input for rotation therewith and a second group of forward gears is supported on the second input shaft for rotation therewith. A third group of forward gears which correspond to the first and second groups of forward gears connect with the output shaft. The transmission also includes an electric motor having an output shaft connecting with the input shafts for changing angular velocity of the input shafts in response to an electrical signal during a shift to obtain a desired transmission ratio. A non-friction, controllable, first coupling assembly has a first coupling state for coupling the electric motor to the first input shaft and a second coupling state for coupling the electric motor to the second input shaft. The first coupling assembly is non-hydraulically controlled to change state. At least one non-friction, controllable, second coupling assembly is also provided. Each second coupling assembly has a first coupling state for coupling an input target gear on one of the input shafts to an output target gear on the transmission output shaft and a second coupling state for uncoupling the target gears. Each second coupling assembly is non-hydraulically controlled.

The motor may synchronize shifts between transmission ratios.

The transmission may have a creep mode wherein the motor provides torque during the creep mode.

The transmission may have a reverse mode wherein the motor provides torque in the reverse mode.

The transmission may have a launch mode wherein the motor provides torque in the launch mode.

The motor may be utilized in idle-off operations in response to a control signal.

The transmission may further include a non-friction, controllable, third coupling assembly connecting with the transmission output shaft and having a first coupling state for allowing forward vehicular movement and a second coupling state for grounding reverse vehicular movement.

The motor may be utilized for regenerative braking in response to a control signal.

The motor may be utilized in a torque boost operation.

The transmission may be an electronically-controlled, dual clutch transmission.

The transmission may further include a synchronizing shaft coupled to the output shaft of the motor.

The transmission may further include a gear train coupling the output shaft of the motor to the synchronizing shaft.

DETAILED DESCRIPTION OF EXAMPLE EMBODIMENTS

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 3:
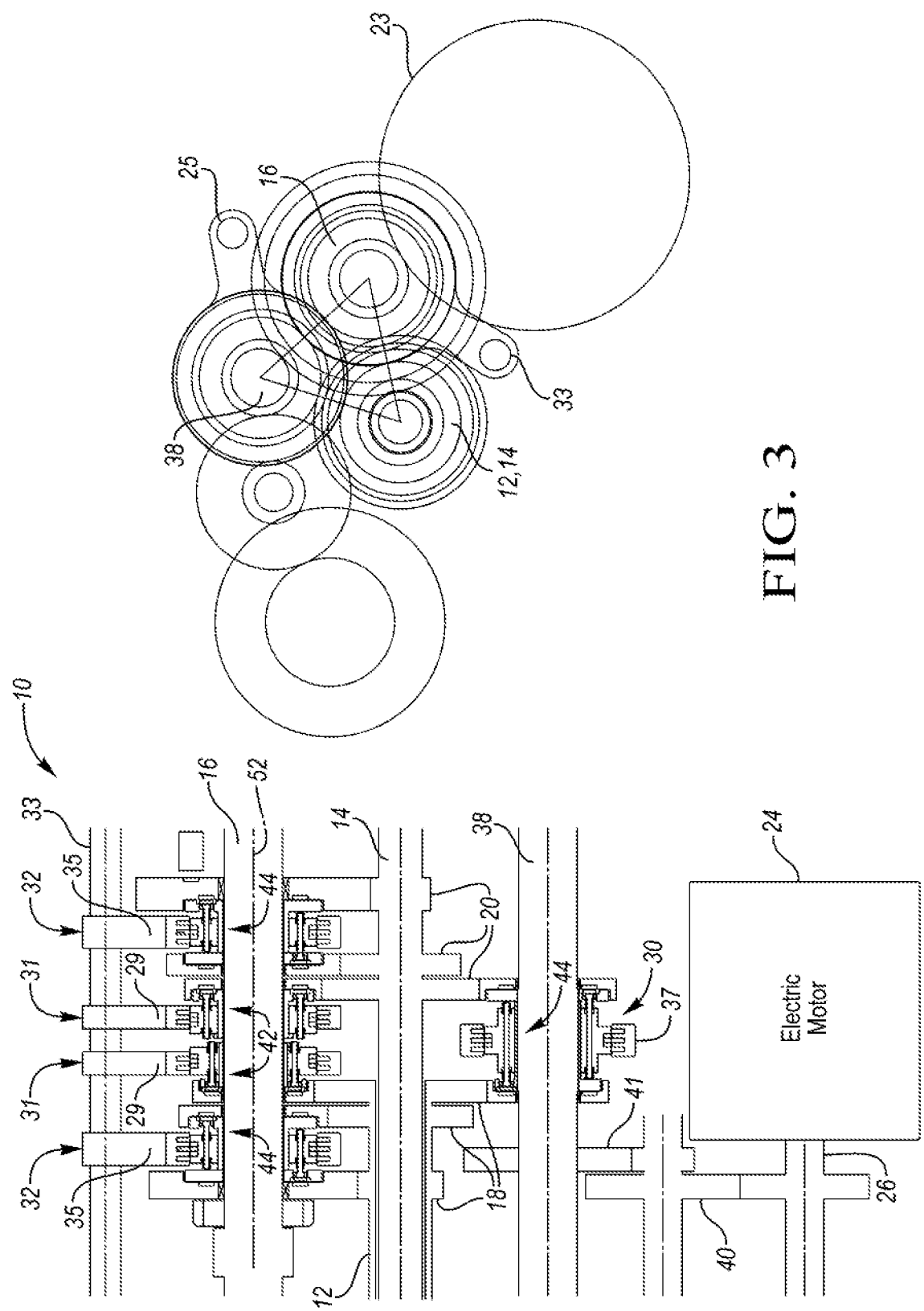
FIG. 3 is a schematic diagram, partially broken away, of a six-speed electronic dual clutch transmission (EDCT) with a drawing of corresponding pitch line diameters.

FIG. 3 is a schematic diagram illustrating at least an embodiment of an electronic dual clutch transmission (EDCT), generally indicated at 10, of the present invention. Other embodiments are generally indicated at 10', 10" and 10'" in FIGS. 17b, 17c and 18, respectively. The transmission 10 includes first and second input shafts 12 and 14, respectively, and a transmission output shaft 16. A first group 18 of forward gears ($2^{nd}$, $4^{th}$ and $6^{th}$) is supported on the first input shaft 12 for rotation therewith. A second group 20 of forward gears ($5^{th}$, $3^{rd}$ and $1^{st}$) is supported on the second input shaft 14 for rotation therewith.

A third group 22 of forward gears (FIG. 4) correspond to the first and second groups 18 and 20, respectively, of forward gears and connect with the output shaft 16 through coupling assemblies, generally indicated at 31 and 32. The third group 22 of gears are rotatably supported on the shaft 16 by bearings 33. The output shaft 16 is connected to a differential first drive 23 (FIG. 3).

An electric motor 24 having an output shaft 26 connects with the input shafts 12 and 14 via coupling assemblies, generally indicated at 30 and 27 (FIGS. 7-11), for changing angular velocity of the input shafts 12 and 14 in response to an electrical signal during a shift to obtain a desired transmission ratio.

The non-friction, controllable, first coupling assembly 30 has a first coupling state for coupling the electric motor 24 to the first input shaft 12 and a second coupling state for coupling the electric motor 24 to the second input shaft 14. A sync/reverse rod 25 supports a stator subassembly 37 of the assembly 30 and a stator subassembly 39 of the assembly 27. The first coupling assembly 30 is non-hydraulically controlled to change state. A part of each of the coupling assemblies 30 and 27 is splined to the shaft 38 to rotate therewith.

The non-friction, controllable, second coupling assemblies 31 and 32 each have a first coupling state for coupling an input target gear on one of the input shafts 12 or 14 to an output target gear on the transmission output shaft 16 and a second coupling state for uncoupling the target gears. A part of each second coupling assembly 32 is splined to the output shaft 16 to rotate therewith. A stator subassembly 35 of each second coupling assembly 32 is supported on a 1-6 gear rod 33. A stator subassembly 29 of each second coupling assembly 31 is also supported on the rod 33. Each second coupling assembly 32 is non-hydraulically controlled.

The motor 24 synchronizes shifts between transmission ratios described with reference to FIGS. 7 and 8.

The transmission 10 has a creep mode wherein the motor 24 provides torque during the creep mode as described with reference to FIG. 9.

The transmission 10 has a reverse mode wherein the motor 24 provides torque in the reverse mode as described with reference to FIG. 9.

The transmission 10 has a launch mode wherein the motor 24 provides torque in the launch mode as described with reference to FIG. 10.

The motor 24 is utilized in idle-off operations in response to a control signal as described with reference to FIG. 11.

The transmission 10 further includes a non-friction, controllable, third coupling assembly (details in FIGS. 12 and 13), connecting with the transmission output shaft 16 via a plate 112 mounted on the shaft 16 and having a first coupling state for allowing forward vehicular movement and a second coupling state for grounding reverse vehicular movement as described with reference to FIG. 11.

The motor 24 may be utilized for regenerative braking in response to a control signal as described with reference to FIG. 16.

The motor 24 may be utilized in a torque boost operation as described with reference to FIG. 16.

The transmission 10 is preferably an electronically-controlled, dual clutch transmission including a dual clutch module 36 such as the Luk-Dry dual clutch module of FIGS. 8-11 and 14, 16 and 18. The transmission 10' of FIG. 17b has such a clutch module 36', the transmission 10" of FIG. 17c, has such a clutch module (not shown) and the transmission 10'" of FIG. 18 has such a clutch module 36'".

The transmission 10, further includes the synchronizing shaft 38 coupled to the output shaft 26 of the motor 24 via a gear train 40 such as a gear reduction train coupling the output shaft 26 of the motor 24 to the synchronizing shaft 38 through a gear 41 mounted on the shaft 38.

Referring again to FIGS. 3, 4 and 7, the second coupling assemblies 32 and the coupling assembly 30 typically each includes a 3-position linear stepper motor, generally indicated at 44, including the stator subassemblies 35 and 37, respectively. The coupling assemblies 31 and 27 each includes a 2-position linear stepper motor, generally indicated at 42, including the stator assemblies 29 and 39 that are independent of each other allowing any shift from odd to even and vice-versa.

Figure 1:
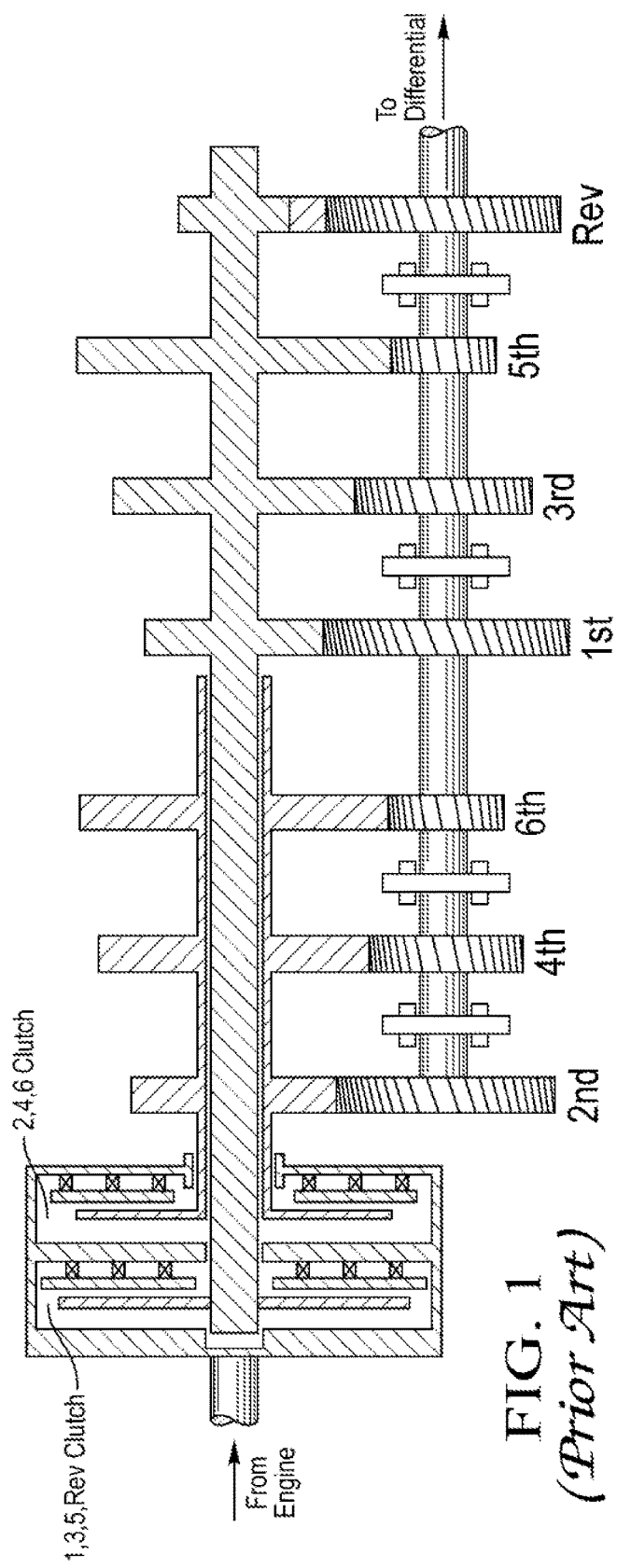
FIG. 1 is a schematic diagram of a prior art dual-clutch transmission having a single output shaft.
Figure 2:
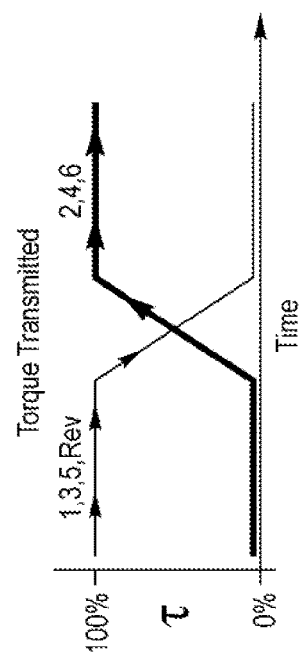
FIG. 2 is a graph of percent torque transmitted versus time for a typical dual clutch transmission.
Figure 5:
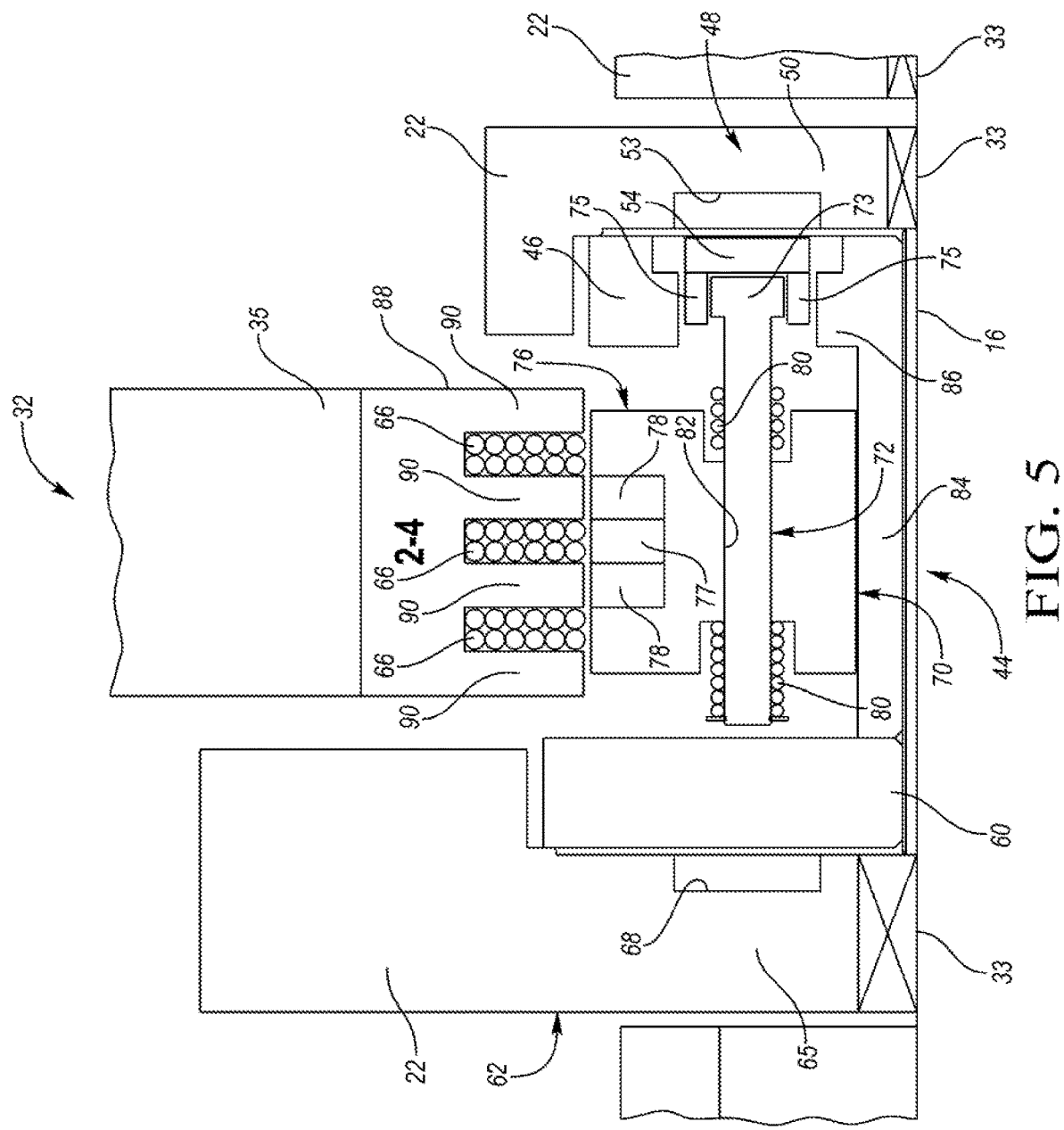
FIG. 5 is an enlarged schematic diagram, partially broken away, of one of the 3-position linear stepper motors and coupling assemblies of FIGS. 3 and 4 and constructed in accordance with at least one embodiment of the present invention.
Figure 6:
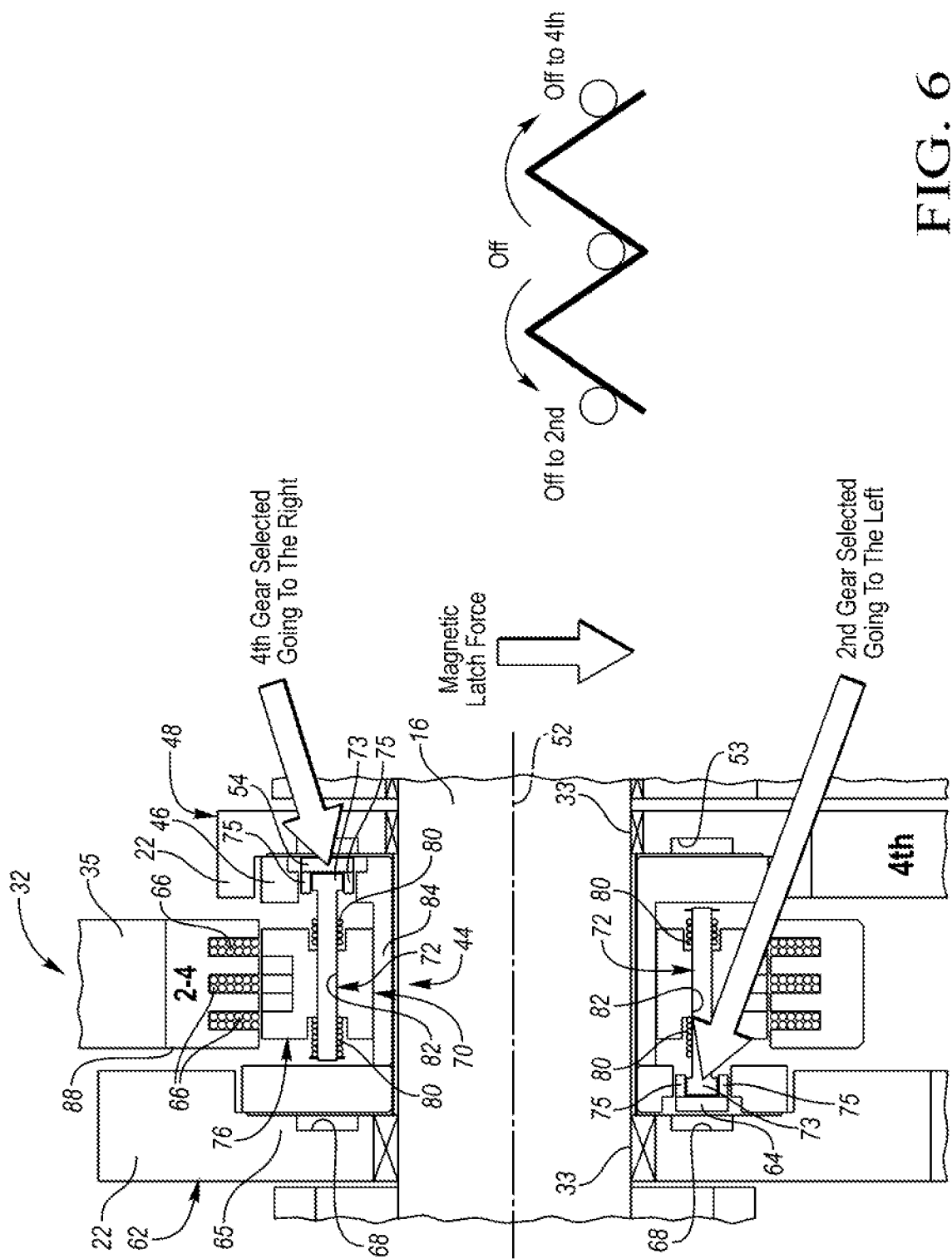
FIG. 6 is a schematic diagram of the stepper motor of FIG. 5 magnetically latching two, 2-way controllable mechanical diodes (i.e. coupling assemblies)

Referring to FIGS. 5 and 6, a preferred 3-position linear stepper motor assembly is generally indicated at 44 (a 2-position linear stepper motor is generally indicated at 10 in FIGS. 1 and 2 of U.S. provisional patent application No. 61/882,694 filed Sep. 26, 2013 which is hereby incorporated in its entirety herein). Each 2-position linear stepper motor 42 is substantially the same in structure and function as the 3-position linear stepper motor 44. Consequently, only one of the motors 44 is described in detail hereinbelow.

The 3-position linear stepper motor 44 forms a part of each overrunning, non-friction coupling or clutch and control assembly 32.

The assembly 32 includes a first pair of coupling members or plates 46 and 48. The plate 46 is a pocket plate and the plate 48 is the powdered metal gear 22 integrated with a notch plate 50 which has notches 53. The plates 46 and 48 are supported for rotation relative to one another about a common rotational axis 52 of the output shaft 16. The plate 48 is supported on the shaft 16 by the bearing 33. A first locking member or strut 54 selectively mechanically couples the first pair of plates 46 and 48 together to prevent relative rotation of the first pair of plates 46 and 48 with respect to each other in at least one direction about the axis 52.

The assembly 32 also includes a second pair of coupling members or plates 60 and 62 supported for rotation relative to one another about the common rotational axis 52 and a second locking member or strut 64 (FIG. 6) for selectively mechanically coupling the second pair of plates 60 and 62 together to prevent relative rotation of the second pair of plates 60 and 62 with respect to each other in at least one direction about the axis 52. The gear 22 is integrally formed with a plate 65 to form the plate 62 which has notches 68.

The stepper motor 44 includes the stator subassembly 35 including at least one coil 66 (three shown) to create an electromagnetically switched magnetic field and to create a magnetic flux when the at least one coil 66 is energized.

The stepper motor 44 further includes a magnetically-latching actuator subassembly, generally indicated at 70, including at least one bi-directionally movable connecting structure, such as spring-biased rods, generally indicated at 72. Each rod 72 is coupled to one of the first and second locking members 54 or 64 at an end portion 73 thereof for selective, small-displacement locking member movement. In particularly, each end portion 73 is pivotally connected to legs 75 of its locking member or strut 54 or 64 by pins (not shown but shown in the above mentioned provisional application).

The actuator subassembly 70 further includes a magnetic actuator, generally indicated at 76, coupled to the rods 72 and mounted for controlled reciprocating movement along the rotational axis 52 relative to the first and second pairs of coupling members 46, 48, 60 and 62 between a first extended position which corresponds to a first mode of the first pair of coupling members 46 and 48 and a second extended position which corresponds to a second mode of the second pair of coupling members 60 and 62. The first rod 72 actuates the first locking member 54 in its extended position, so that the first locking member 54 couples the first pair of coupling members 46 and 48 for rotation with each other in at least one direction about the rotational axis 52. The second rod 72 actuates the second locking member 64 to couple the second pair of coupling members 60 and 62 for rotation with each other in at least one direction about the rotational axis 52. The magnetic actuator 76 completes a path of the magnetic flux to magnetically latch in the first and second extended positions. A control force caused by the magnetic flux is applied to linearly move the magnetic actuator 76 between the first and second extended positions along the rotational axis 52.

The magnetic actuator 76 preferably includes a permanent magnet source 77 sandwiched between a pair of annular field redirection rings 78. The magnetic source 77 is preferably an annular, rare earth magnet which is axially magnetized.

In other words, the electromechanical apparatus or motor 44 controls the operating mode of a pair of coupling apparatus, each of which has drive and driven members supported for rotation relative to one another about the common rotational axis 52 of the output shaft 16. Each drive member may be a pocket plate 46 or 60 and the driven member may be a notch plate 50 or 65. Each coupling apparatus or assembly may include two struts 54 or 64 for selectively mechanically coupling the members of each coupling assembly together and change the operating mode of each coupling assembly. Preferably, the struts 54 and 64 are spaced at 90° and/or 180° intervals about the axis 52.

The apparatus or motor 44 includes the stator subassembly 35 which has one or more (preferably three) electromagnetically inductive coils 66 to create a first magnetic flux when the coils 66 are energized.

The apparatus or motor 44 also includes the actuator subassembly 70 adapted for coupling with the members or plates of both of the coupling apparatus to rotate therewith. The motor 44 is supported on the output shaft 16 for rotation relative to the coils 66 about the rotational axis 52. The motor 44 typically includes two or more bi-directionally movable rods 72. Each rod 72 has the free end 73 adapted for connection to a strut for selective, small-displacement, strut movement.

Figure 4:
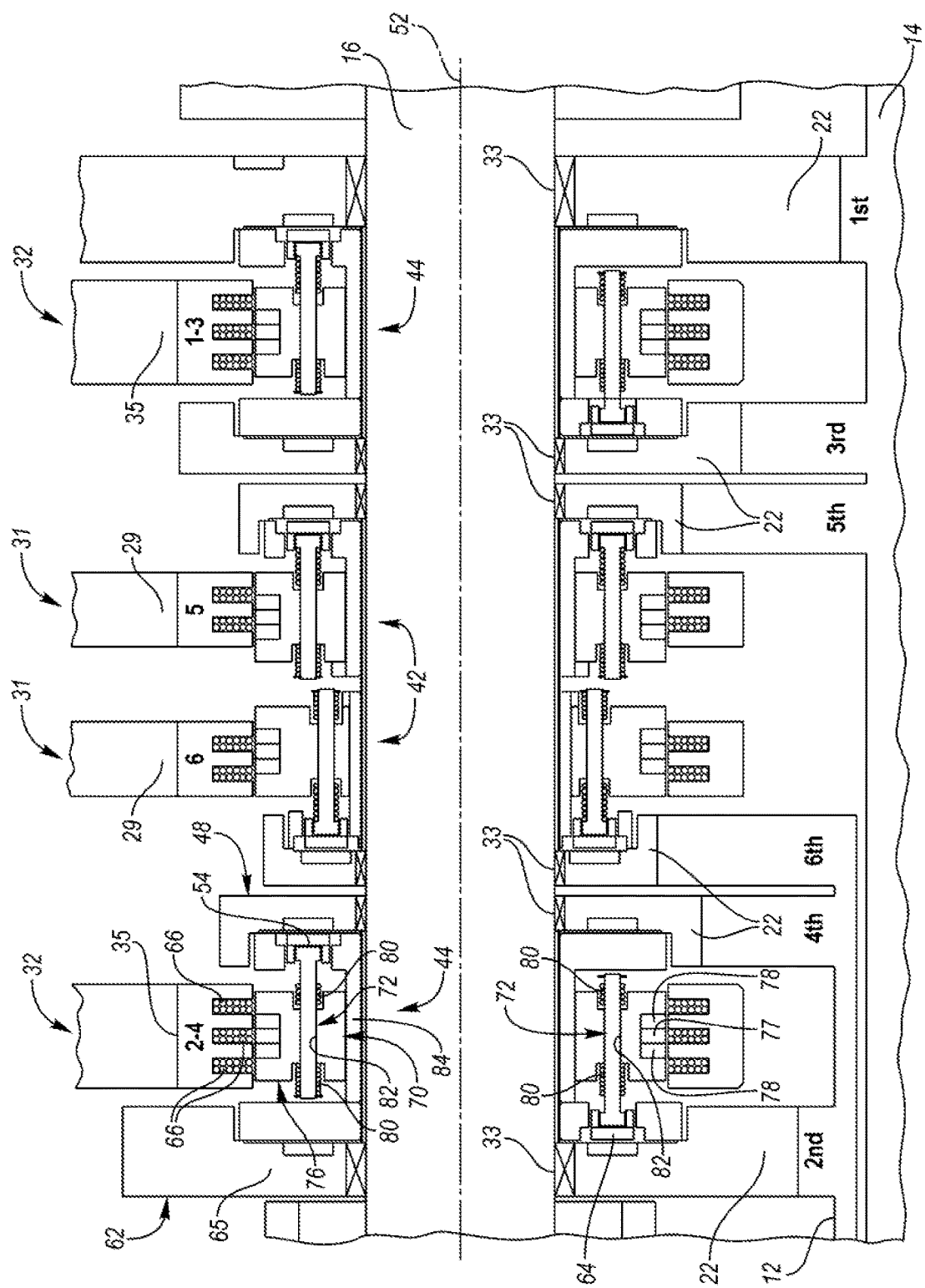
FIG. 4 is an enlarged portion of the diagram of FIG. 3 showing a plurality of 2- and 3-position linear stepper motors that are independent of each other and which connect with an output shaft of the transmission.

The motor 44 also includes the actuator 76 operatively connected to the rods 72 for selective bi-directional shifting movement along the rotational axis 52 between a first position of the actuator 76 which corresponds to a mode (i.e. $4^{th}$ gear) of the first coupling apparatus (plate 50 and plate 46) and a second position of the actuator 76 which corresponds to a mode (i.e. $2^{nd}$ gear) of the coupling apparatus (plate 60 and plate 65). The two rods 72 are spaced 180° apart from one another as shown in FIGS. 4 and 5. The different modes may be locked and unlocked (i.e. free wheeling) modes.

A first magnetic control force is applied to the actuator 76 when the at least one coil 66 is energized to cause the actuator 76 to move between its first, second, and neutral positions along the axis 52 as shown in the right hand side of FIG. 6.

The motor 44 includes a pair of spaced biasing spring members 80 for each rod 72 for exerting corresponding biasing forces on the actuator 76 in opposite directions along the axis 52 when the actuator 76 moves between its first, second and third positions along the axis 52. The actuator 76 has a hole 82 for slideably receiving and retaining the connecting rods 72. When the actuator 76 moves, it pushes/pulls its respective springs between its faces and the ends of its corresponding rods 72.

The motor 44 includes a hub 84 adapted for coupling with plates 46 and 60 of the two coupling apparatus. The hub 84 is splined for rotation with the shaft 16 about the rotational axis 52. The hub 84 slidably supports the actuator 76 during corresponding shifting movement along the rotational axis 52.

The motor 44 includes of spaced stops, only one of which is shown at 86, supported on the hub 84 to define the first and second positions of the actuator 76.

The motor 44 also preferably includes a set of spaced guide pins (not shown) sandwiched between inner surface of the actuator 76 and an outer surface of the hub 84 and extending along the rotational axis 52. The inner surfaces and the outer surface have V-shaped grooves or notches (not shown) formed therein to hold the guide pins. The actuator 76 slides on the guide pins during shifting movement of the actuator 76 along the rotational axis 52. The guide pins pilot the actuator 76 on the hub 84. The hub 84 also distributes oil to the guide pins.

The stator subassembly 35 includes a ferromagnetic housing 88 having spaced apart fingers 90 and the electromagnetically inductive coils 66 housed between adjacent fingers 90.

The actuator 76 is an annular part having the magnetic annular ring 77 sandwiched between the pair of ferromagnetic backing rings 78. The magnetic control forces magnetically bias the fingers 90 and their corresponding backing rings 78 into alignment upon coil energization. These forces latch the actuator 76 in the two "on" positions and the "off" position. The rings are acted upon by the stator subassembly 35 to move the actuator 76.

A hollow cylindrical bushing (not shown) may slidably support each rod 76 in its aperture 82 during bi-directional shifting movement thereof.

Referring again to FIG. 6, the 3-position linear stepper motor 44 is shown magnetically latching the 2-way clutch assemblies. In the upper portion of FIG. 6, the fourth gear is selected for rotation going to the right. In the lower portion of FIG. 6, the second gear is selected going to the left. As shown in the saw-tooth graph in FIG. 6, the magnetic latch force is "off" in the center.

Figure 7:
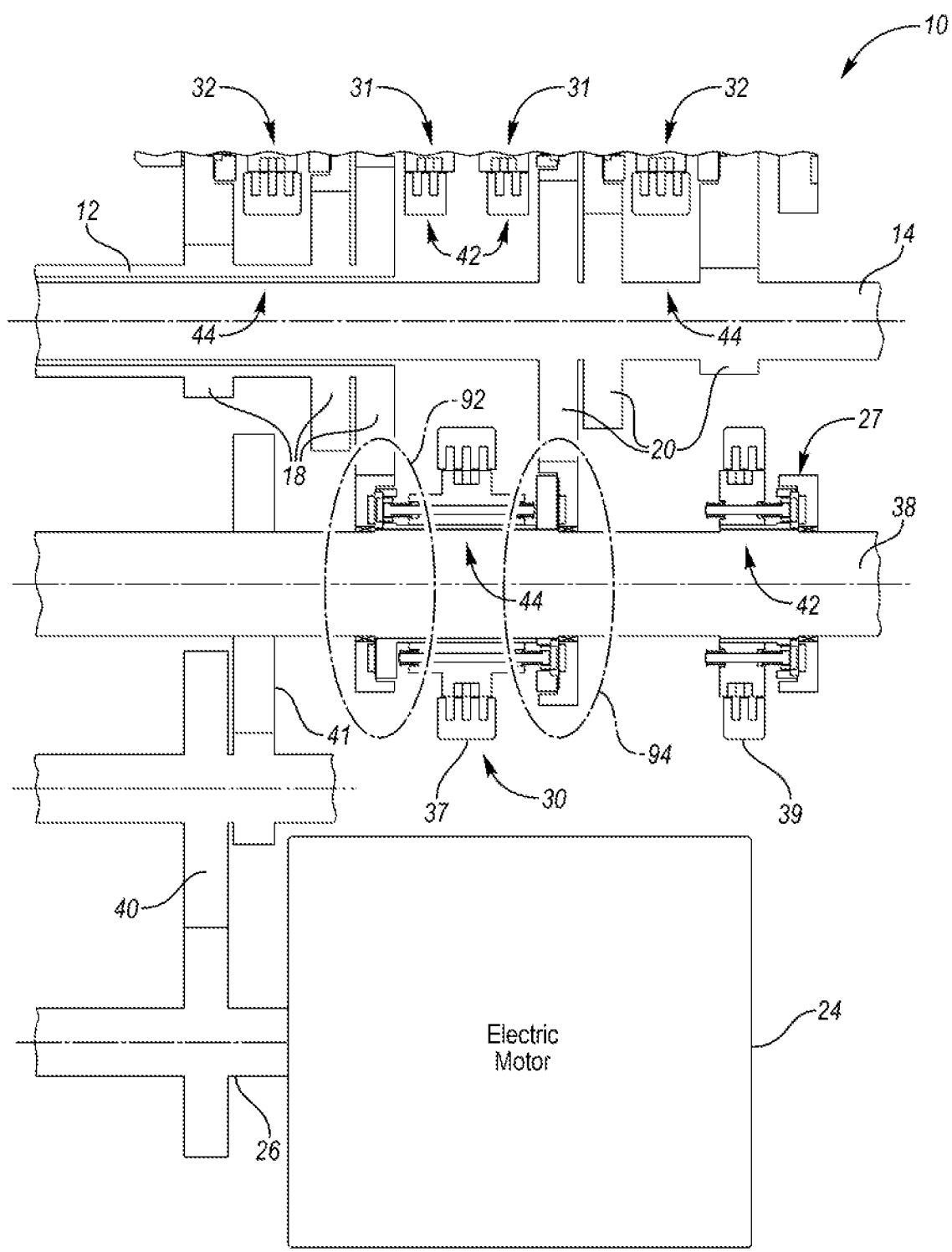
FIG. 7 is a schematic diagram, partially broken away, which shows how pre-selected gears get synched prior to engaging a 2-way coupling assembly (i.e., mechanical diode)

Referring to FIG. 7, there is illustrated how pre-selected gears get synched prior to engaging their respective 2-way clutch assembly (i.e. mechanical diode (MD)).

The sync e-motor 24 (i.e. electric motor) can be connected in three ways:
to the 2,4,6 input shaft 12 (as shown by ellipse 92)
to the 1,3,5,R input shaft 14 (as shown by ellipse 94)
neutral—disconnected from both shafts 12 and 14

The e-motor 24 will spin up the inactive input shaft to match the speed through the oncoming pre-selected gear to the output shaft 16. Once the speed is synced, the appropriate 3-position linear stepper motor 44 will turn on the 2-way MD (i.e., mechanical diode) to engage the pre-selected gear with the output shaft 16.

Figure 8:
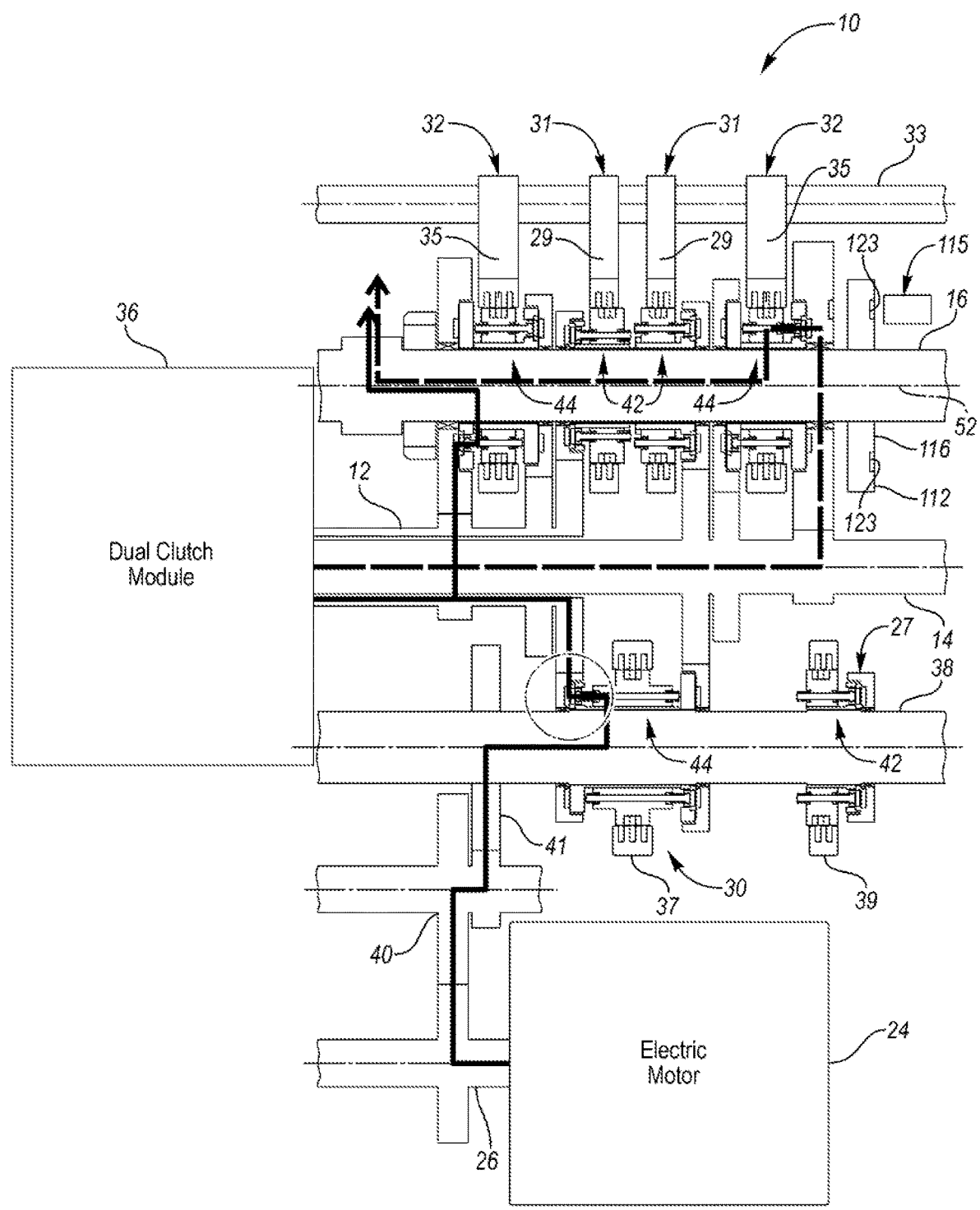
FIG. 8 is a schematic diagram, partially broken away, which shows the power or torque flows from a dual clutch module and an electric motor of the transmission for a 1-2 transmission shift.

Referring to FIG. 8, there is illustrated a 1-2 shift of the transmission 10.
In first gear, start of 1-2 shift
2,4,6 syncro clutch 30 is turned on (as indicated by the dashed circle) connecting the e-motor 24 to the 2,4,6 input shaft 12.
E-motor 24 spins up oncoming 2,4,6 shaft 12 and gear, syncing the speed of the input shaft 12 to the output shaft 16 via second gear ratio.
Second gear 2-way clutch is turned on (pre-selected) via 3-position linear stepper motor 44 locking the output gear to the 2,4,6 shaft second gear.
E-motor 24 is turned off.
Dual clutch module 36 clutch-to-clutch shift is executed.

Figure 9:
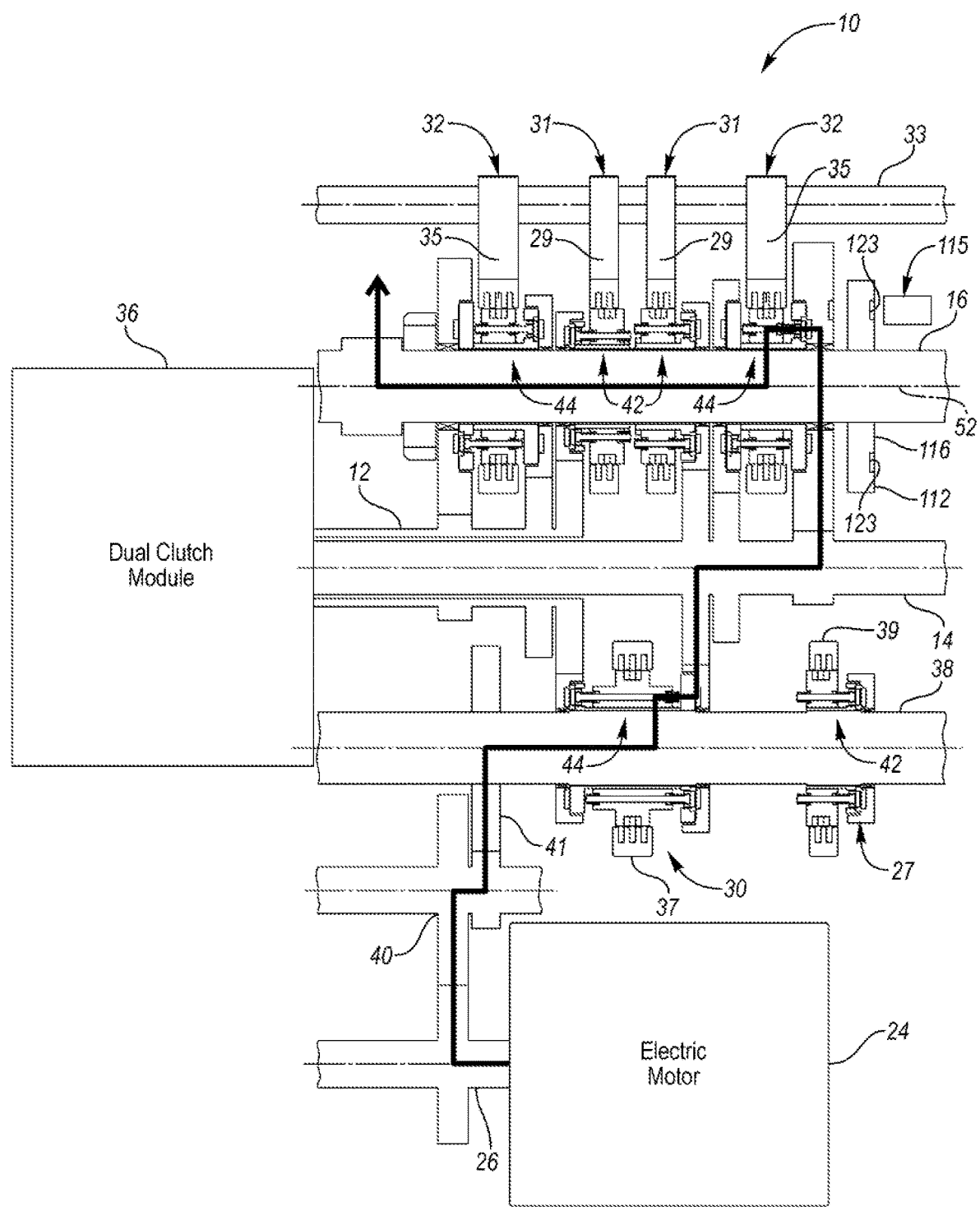
FIG. 9 is a schematic diagram, partially broken away, which shows a torque flow from the electric motor for a creep mode of the transmission.

Referring to FIG. 9, there is illustrated a creep mode of the transmission 10.

The dual clutch module 36 is completely off. The electric motor 24 preferably has a couple of different overall ratios ranges, 50:1 to 63:1. The latter requires the e-motor 24 to spin between 2400 to 2500 RPM to achieve a vehicle speed of 3 mph. There is very fine control in this mode to modulate the vehicle creep speeds.

For reverse, the e-motor 24 could be run in the reverse direction while in first gear. The ICE (i.e., internal combustion engine) could be running an upsized generator/alternator and run this in a serial hybrid mode allowing rock cycling via the e-motor 24. There is also a reverse gear for the ICE if not rock cycling.

Figure 10:
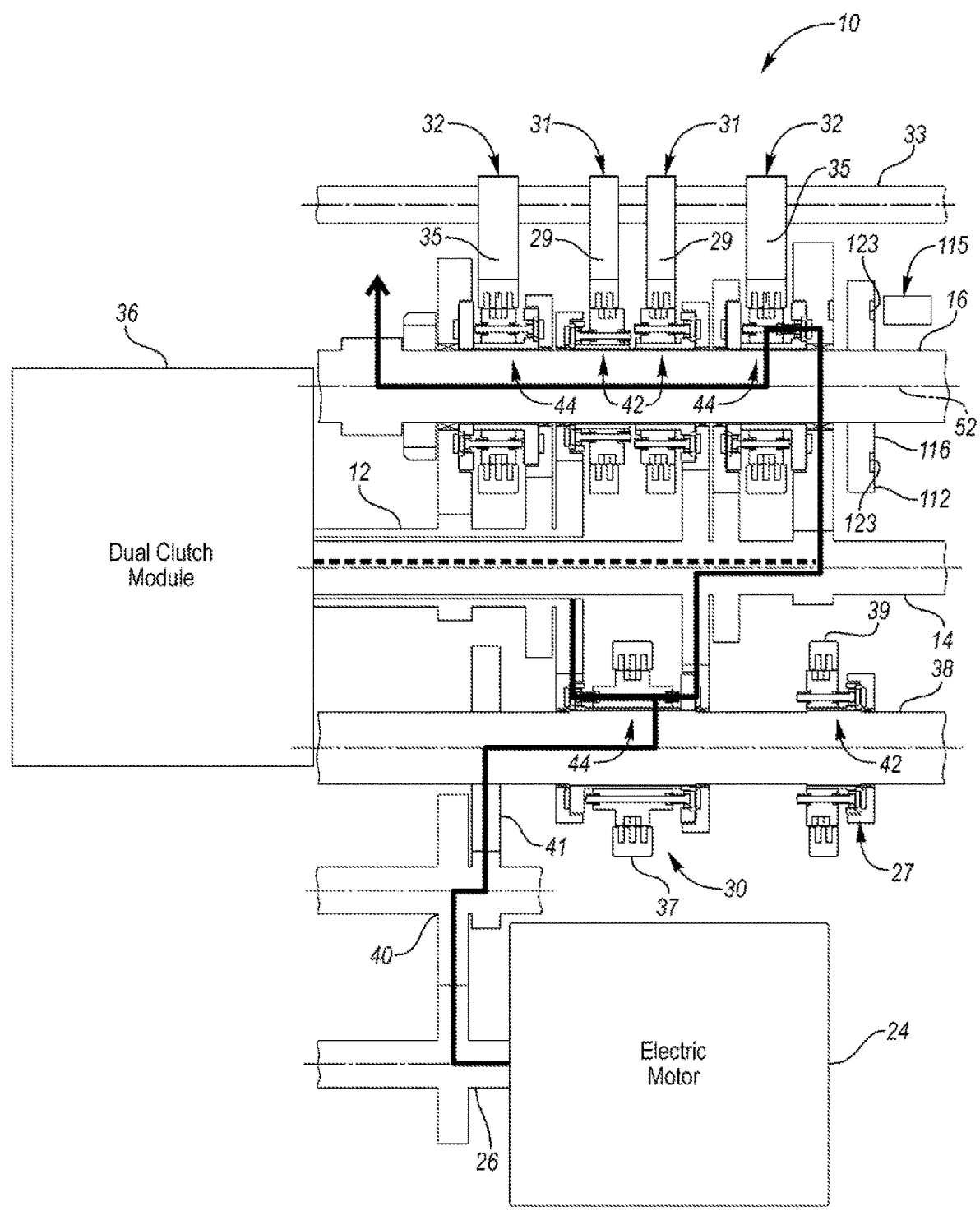
FIG. 10 is a schematic diagram, partially broken away, which shows torque flows from the clutch module and the electric motor is a launch mode of the transmission with an internal combustion engine (ICE) starter option.

Referring to FIG. 10, there is illustrated a launch mode of the transmission 10 with an internal combustion engine (ICE) starter option.
The dual clutch module 36 is completely off. The electric motor 24 would drive the vehicle from zero to a speed just prior to the 1-2 shift line.
At that point, the 1,3,5 clutch of the module 36 would apply spinning up the ICE and starting it.
A torque hand-off would take place between the ICE and the e-motor 24.
The e-motor 24 would disconnect from the 1,3,5,R input shaft 14 and connect to the 2,4,6 input shaft 12 to prepare to pre-select second gear.

Figure 11:
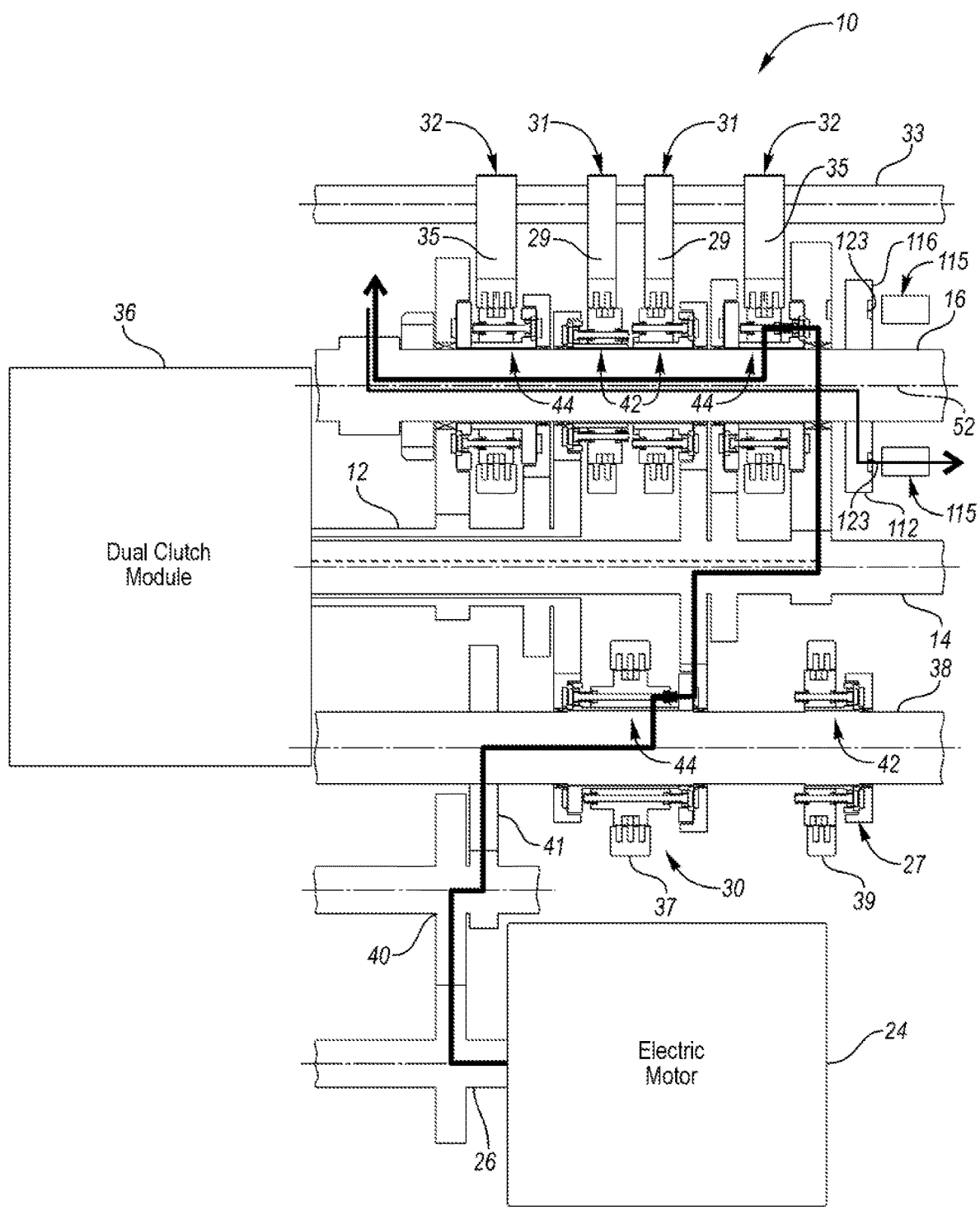
FIG. 11 is a schematic diagram, partially broken away, which shows torque flows from the clutch module and the electric motor in "idle off" and "hill hold"
Figure 12:
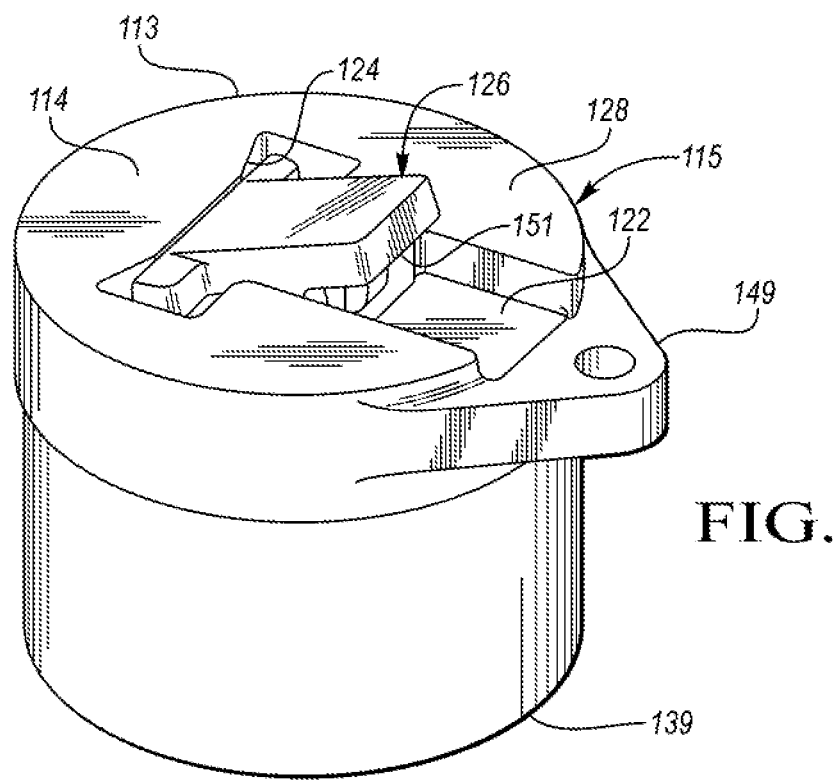
FIG. 12 is a top perspective view of a selectable solenoid insert (SSI) or electromechanical apparatus utilized in the "hill hold" mode with a locking member or strut in its extended coupling position.
Figure 13:
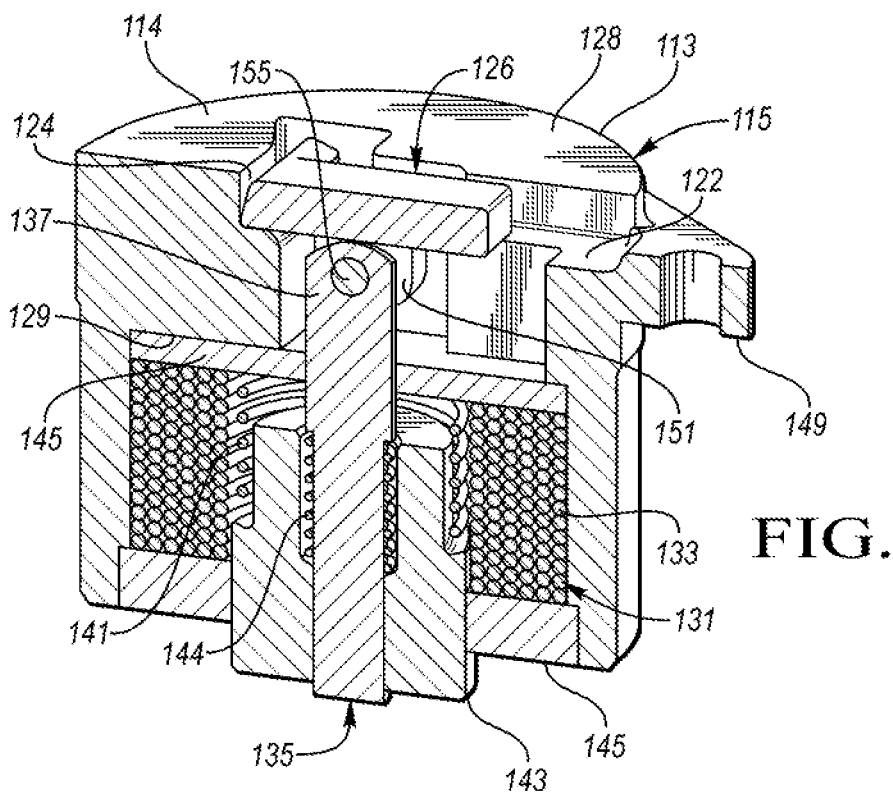
FIG. 13 is a side perspective sectional view of the apparatus of FIG. 12 with the locking strut in its retracted uncoupling position.

Referring to FIG. 11, there is illustrated an idle off and hill hold feature.
When the vehicle coasts down the first gear and is below 3 mph, a hill hold OWC solenoid, generally indicated at 115, comes on. Details of the solenoid 115 are shown in FIGS. 12 and 13. The hill hold OWC freewheels about the one or more axis 52.
When the vehicle is below mechanical ratio of first gear and/or the brakes are applied, the clutches of the module 36 come off and the ICE is shut down. Reverse direction is grounded (HH).
The e-motor 24 should already be connected to the 1,3,5 input shaft 14 when a 2-1 was conducted. It is ready to creep or launch. Some minimum torque should be applied if the brake is not applied to creep.

Referring to FIGS. 12 and 13, there is generally illustrated an SSI (selectable solenoid insert) or the solenoid 115. The SSI 115 is disclosed in U.S. provisional patent application No. 61/870,474 filed Aug. 27, 2013 which is hereby incorporated in its entirety by reference herein.

As disclosed in U.S. Ser. No. 61/870,434, a planar, controllable coupling assembly is disclosed. The assembly includes a first coupling member, the notch plate or member 112 (FIGS. 8-11), a second coupling member (not shown) and the electromechanical apparatus 115. The coupling assembly may be a ratcheting, 1-way clutch assembly. The first member 112 includes a coupling face 116 in closed-spaced opposition with an outer coupling face 114 of a housing part 113 of the solenoid 115 when the first and second members are assembled and held together by a locking or snap ring (not shown). The member 112 is mounted on the output shaft 16 for rotation about the common rotational axis 52.

The outer coupling face 114 of the housing part 113 has a single, T-shaped recess or pocket 122. The recess 122 defines a load-bearing first shoulder 124. The second coupling face 116 of the notch plate 112 has a plurality of recesses or notches 123. Each notch of the notches 123 defines a load-bearing second shoulder.

The electromechanical apparatus or solenoid 115 may include a locking strut or element, generally included at 126, disposed between the coupling faces 114 and 116 of the housing part 113 and the member 112, respectively, when the member 112 is assembled with the member holding the apparatus 115.

The element 126 may comprise a metal locking element or strut movable between first and second positions. The first position is characterized by abutting engagement of the locking element 126 with a load-bearing shoulder of the member 112 and the shoulder 124 of the pocket 122 (FIG. 12) formed in an end wall 128 of the housing part 113. The second position is characterized by non-abutting engagement of the locking element 126 with a load-bearing shoulder of at least one of the member 112 and the end wall 128 (FIG. 13).

Alternatively, the element 126 may be an impact energy storage element or synthetic rubber strut, to dampen the rotation between the member 112 and the member holding the apparatus 115.

The electromechanical apparatus 115 includes the housing part 113 which has a closed axial end including the end wall 128. The end wall 128 has the outer coupling face 114 with the single pocket 122 which defines the load-bearing shoulder 124 which is in communication with an inner face 129 of the end wall 128. The housing part 113 may be a powdered metal or aluminum (MIM) part.

The apparatus 115 also includes an electromagnetic source, generally indicated at 131, including at least one excitation coil 133 which is at least partially surrounded by the housing part 115.

The element or strut 126 is received within the pocket 122 in a retracted, uncoupling position (FIG. 13). The strut 126 is movable outwardly from the pocket 122 to an extended, coupling position (FIG. 12) characterized by abutting engagement of the strut 126 with a load-bearing shoulder of the notch plate 112.

The apparatus 115 also includes a reciprocating armature, generally indicated at 135, arranged concentrically relative to the at least one excitation coil 133 and is axially movable when the at least one excitation coil 133 is supplied with current. The armature 135 is connected at its leading end 137 to the element 126 to move the element 126 between its coupling and uncoupling positions.

When the element of the apparatus 115 is the rigid locking element 126, the element 126 controls the operating mode of the coupling assembly. When the element of the apparatus 115 is the previously described impact energy storage element, the element absorbs and stores impact energy to reduce undesirable noise and contact stress caused by a transition between operating modes of the coupling assembly.

Whether the element or strut is a locking element or an energy storage element, the element is pivotally connected to the leading end 137 of the armature 135 wherein the armature 135 pivotally moves the element within the pocket 122 in response to reciprocating movement of the armature 135.

The apparatus 115 also preferably includes a return spring 141, upper and lower plates 145, a spring 144, and a hollow tube 143. The coil 133 is wound about the tube 143 between the plates 145. The armature 135 reciprocates within the hollow tube 143. The spring 141 and the tube 143 return the armature 135 to its home position when the coil 133 is de-energized, thereby returning the element 126 to its uncoupling position. In other words, at least one return biasing member in the form of the return spring 141 urges the armature 135 through the plate 145 to a return position which corresponds to the uncoupling position of the element 126. The spring 144 biases the armature 135 towards the coupling position.

The housing may also include a stamped metal cup which preferably has holes to allow oil to circulate within the housing. Preferably, the at least one coil 133, the housing part 113, the cup and the armature 135 comprise a low profile solenoid. The locking element 126 may be a metal injection molded (i.e. MIM) strut.

When the storage element is a synthetic rubber strut, it may include a rigid insert and an elastomeric outer covering layer, bonded to the insert. The outer covering layer may be molded over the insert in a thermoset injection molding process. The storage element may carry high temperature-resistant elastomeric material defining opposite end sections of the storage element. One of the end sections is configured to deflect upon abutting engagement with the shoulder 124 and the other end section deflects upon engagement with a shoulder of the notch plate 112.

The housing part 115 has an apertured attachment flange 149 or possibly two apertured attachment flanges to attach the apparatus 115 to the coupling member (not shown) of the coupling assembly.

The element 126 includes at least one and, preferably, two projecting leg portions 151 which provide an attachment location for the leading end 137 of the armature 135. Each leg portion 151 has an aperture (not shown). The apparatus 115 further comprises a pivot pin 155 received within each aperture to allow rotational movement of the element 126 in response to reciprocating movement of the armature 135 wherein the leading end 137 of the armature 135 is connected to the element 126 via the pivot pin 155.

Preferably, each aperture is an oblong aperture which receives the pivot pin 155 to allow both rotation and translational movement of the element 126 in response to reciprocating movement of the armature 135.

Each locking strut 126 may comprise any suitable rigid material such as metal, (i.e. steel). In accordance with at least one embodiment of the invention, each storage strut may comprise any suitable base polymer that displays rubber-like elasticity, such as an unsaturated or saturated rubber material including, but not limited to, a nitrile rubber such as a hydrogenated nitrile butadiene rubber (HNBR). The storage struts are configured to dampen rotation and, consequently, engagement noise of the clutch assembly. For example, a portion or portions of each storage strut such as the end portion and/or middle portions of each storage strut may comprise one or more elastomeric materials, and the remainder of each storage strut may comprise a metal, such as the metal steel insert.

Generally, each of the storage elements carries resilient material defining the opposite end sections of the storage element. Each storage element is movable between coupling and uncoupling positions between the member 112 and the end wall 128 of the housing part 113. The coupling position is characterized by abutting engagement of the opposite end sections with respective shoulders of the member 112 and the end wall 128. The uncoupling position is characterized by non-abutting engagement of one of its end sections with at least one of the members 112 and the end wall 128. Each end section is configured to deflect or compress upon abutting engagement with respective shoulders of the member 112 and the end wall 128.

Figure 14:
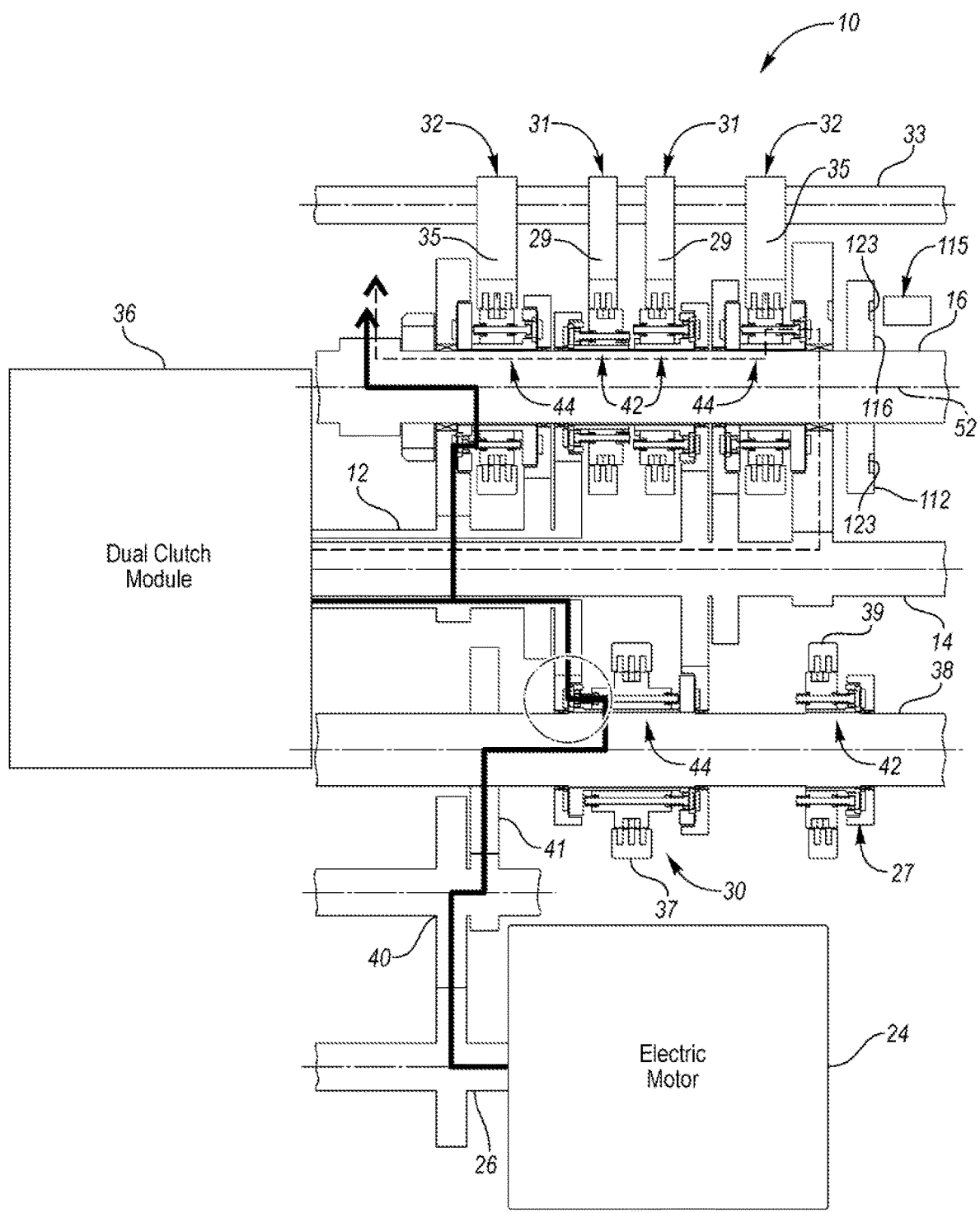
FIG. 14 is a schematic diagram, partially broken away, which shows torque flows from the clutch module and the electrical motor during a shift-assist option of the transmission.

Referring to FIG. 14, there is illustrated a shift-assist option of the transmission 10.

In first gear, start of 1-2 shift
2,4,6 syncro clutch of clutch module 36 is turned on connecting e-motor 24 to 2,4,6 input shaft 12.
E-motor 24 spins up oncoming 2,4,6 shaft 12 and gear, syncing the speed of the input shaft 12 to the output shaft 16 via second gear ratio.
Second gear 2-way clutch 32 is turned on via its 3-position linear stepper motor 44 locking the output gear to the 2,4,6 shaft 12 second gear.
E-motor 24 starts to drive the vehicle, ICE starts to wane.
The 1,3,5 clutch of the module 36 turns off as the e-motor 24 takes over driving the vehicle
The ICE then speed matches the 2,4,6 input shaft 12 and the 2,4,6 clutch of the module 36 applies and a power hand-off occurs with the e-motor 24 and ICE.

Figure 15:
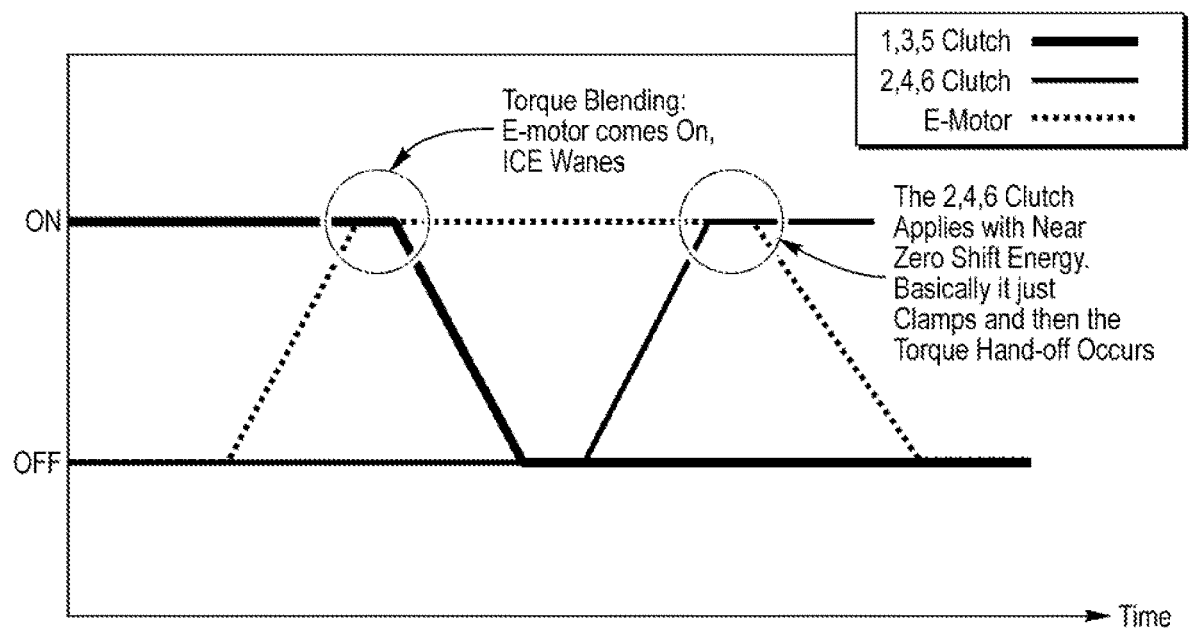
FIG. 15 shows graphs of torque versus time for the 1,3,5 clutch, the 2,4,6 clutch and the electrical motor (i.e. e-motor) when doing a shift-assist.

Referring to FIG. 15 there are illustrated graphs of percent torque versus time by the 1,3,5 clutch of the module 36, the 2,4,6 clutch of the module 36 and the e-motor 24 during the shift-assist option. The left-most arrow indicates torque blending. The e-motor 24 comes on, the ICE wanes. The right-most arrow indicates the 2,4,6 clutch of the module 36 applies with near zero shift energy, basically it just clamps and then the torque hand-off occurs.

The theory is to eliminate shift energy in the dry clutches of the module 36 and to improve shift quality. Instead of doing a clutch-to-clutch shift, two, e-motor-to-clutch shifts are done without torque interruption. Controlling the e-motor 24 is much easier than controlling a friction clutch. These assisted shifts if used would most likely be limited to the larger step shifts, i.e. the 1-2 and 2-3.

Figure 16:
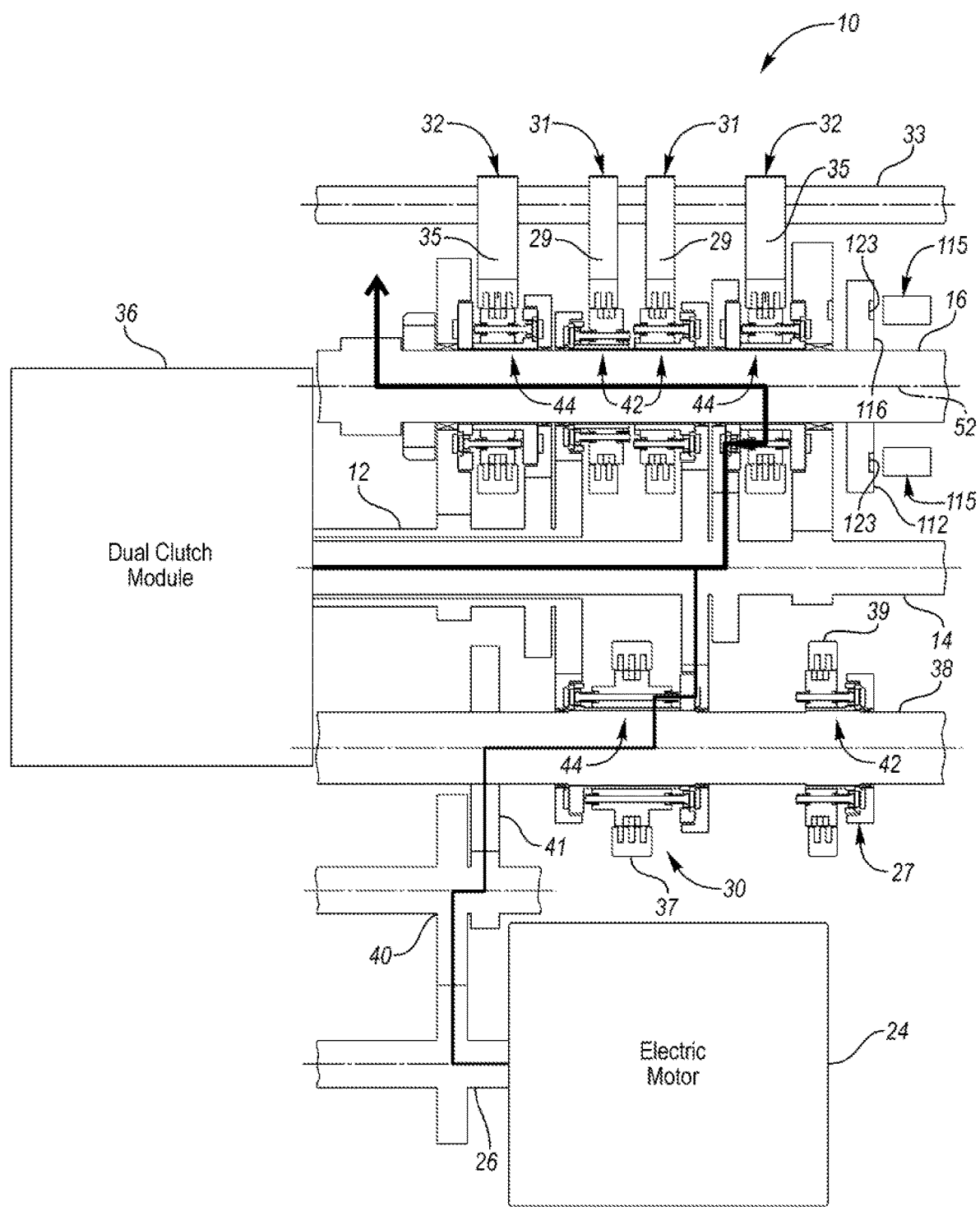
FIG. 16 is a schematic diagram, partially broken away, which shows torque flows from the clutch module and the electric motor during e-motor boost and possible regenerative braking.

Referring to FIG. 16, there is illustrated e-motor boost, fill-in performance holes (parallel operation) and regenerative braking via the power or torque flow lines.

In this case, the vehicle is in third gear. For example, a one liter ICE in one car model has complaints in performance at engine speeds below 2000+ RPM. Also, there are complaints about the amount of time it takes to downshift the transmission to get the wanted torque increase. With an EDCT of at least one embodiment of the present invention, gear state can be maintained and the e-motor 24 can be turned on for instant torque boost.

In addition, with the e-motor 24 having a direct path to the output, regenerative braking is also possible.

Figure 17A:
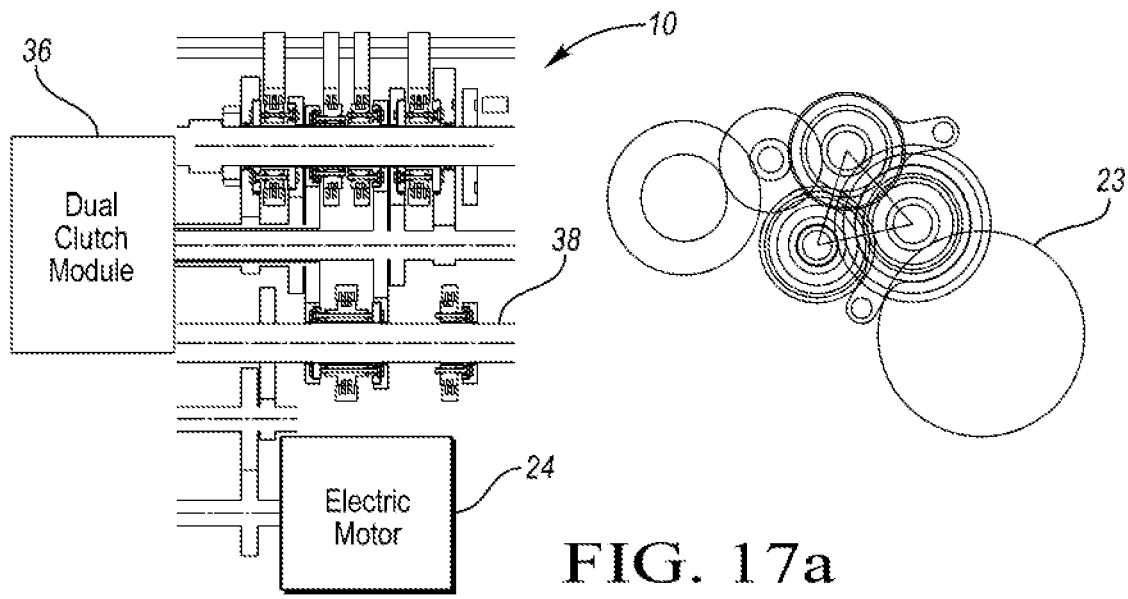
FIGS. 17a, 17b and 17c are schematic drawings with corresponding pitch line diameters showing different possible electric motor configurations or packaging options for at least one embodiment of the transmission.
Figure 17B:
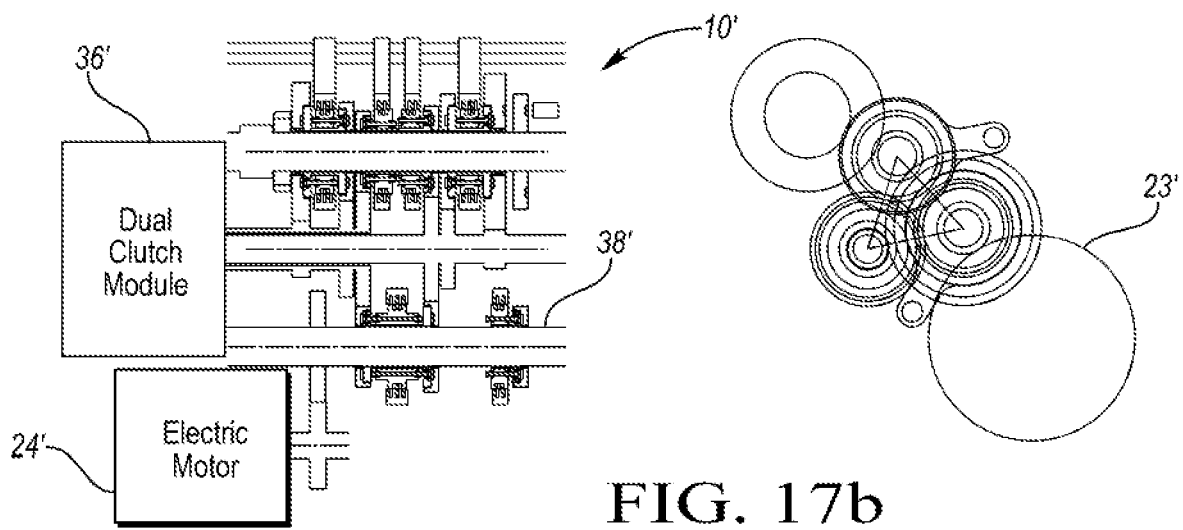
Figure 17C:
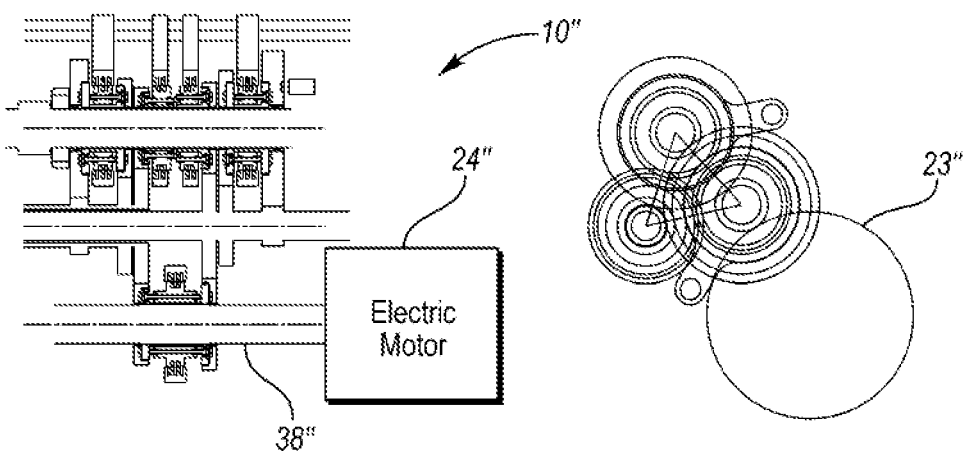

Referring to FIGS. 17a, 17b and 17c, there are illustrated different configurations for the electrical motor (e-motor) at 24, 24' and 24", respectively. The e-motors 24, 24' and 24" can have one or two or no gear reductions to the sync shaft 38, 38' or 38", respectively. There are many packaging options.

The drop from the selected input shaft to the differential 23, 23' or 23" matches the powershift drop.

The center distance from the input to the differential 23, 23' or 23" centerline matches.

The six gear ratios are identical to the powershift ratios. The rough concept drawings on the right parts of FIGS. 17a, 17b and 17c are to scale and show pitch line diameters.

Figure 18:
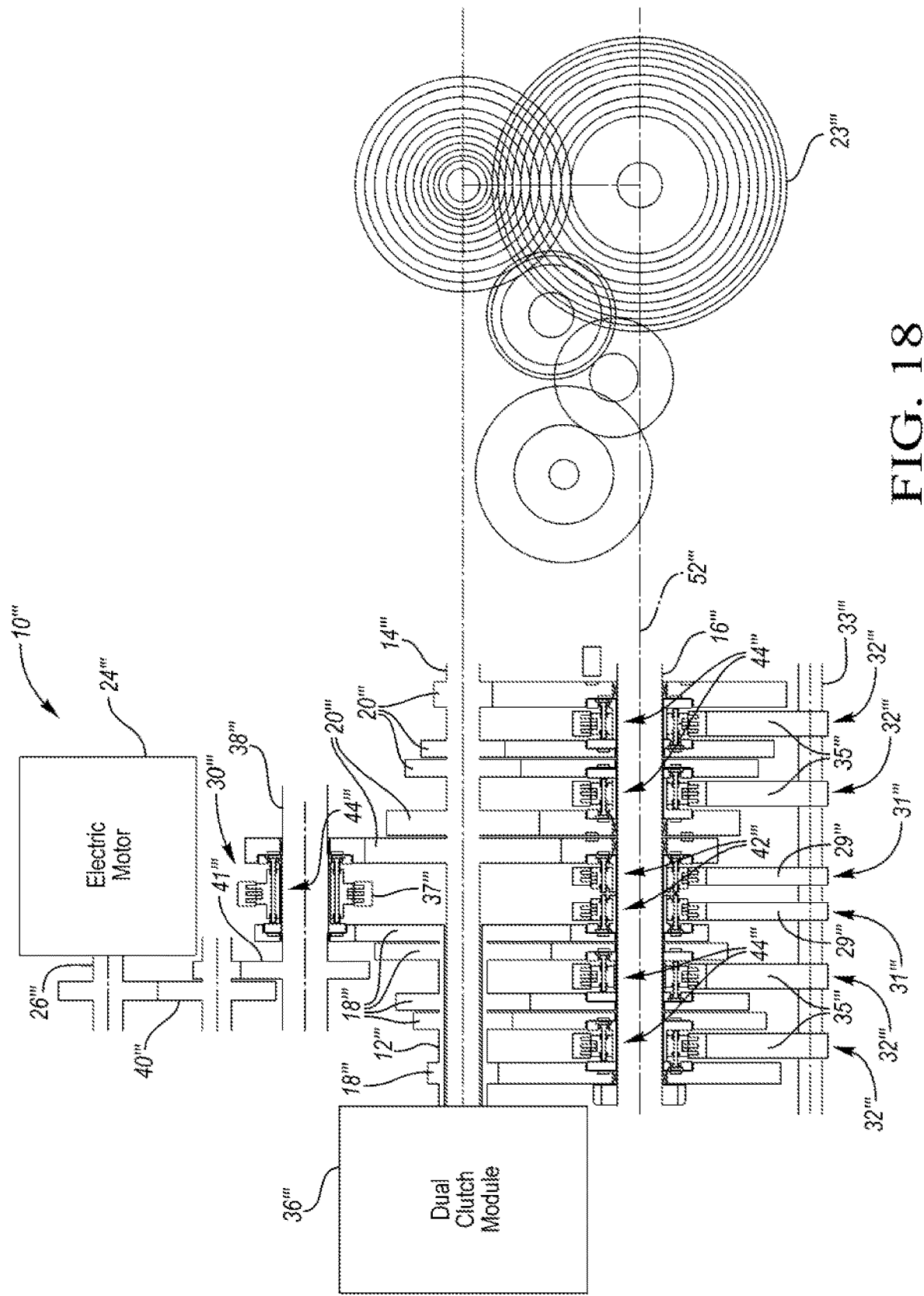
FIG. 18 is a schematic diagram, partially broken away, of a rear wheel drive (RWD) 10-speed transmission constructed in accordance with at least one embodiment of the present invention and a drawing of corresponding pitch line diameters.

Referring to FIG. 18, there is illustrated a rear wheel drive (RWD) 10-speed transmission 10''' of at least one embodiment of the present invention.

In an EV/Switch Hybrid Reverse Option of the transmission 10 (FIG. 3), by using the electric motor 24 exclusively for rev (first gear with e-motor 24 spinning backwards), then the two gears, 2-position linear motor 42, reverse 2-way clutch can all be eliminated. Rock cycling power for the e-motor 24 can be from two sources:

1) The battery (not shown) of the vehicle; and
2) ICE with upsized alternator/generator.

The latter option works like a serial hybrid. The ICE is disconnected from the wheels via the transmission 10 and just runs an alternator/generator that powers the e-motor 42. This option results in a shorter stack (shorter shafts, smaller case).

The advantages of at least one embodiment of the present invention are numerous and include:

Added Modes:

| | |
|---|---|
| Creep Mode | shudder/NVH and over-heating friction clutch eliminated, easier to park |
| Electric Launch | shudder/NVH fix, fuel economy, performance |
| Idle Off | Fuel economy, NVH |
| Coast Of | Fuel economy |
| Hill Hold | Less complexity, saves clutches/brakes |
| Engine Starter | cost, eliminates starter and flexes sync E-motor |
| Shift Assist | Durability, shift quality |
| Performance Boost | Less downshifting, fixes torque hole in ICE |
| EV/Serial Hybrid Rev | Allows for rock cycling, eliminates hardware |

Eliminated complex electro-mechanical systems:

| | |
|---|---|
| Replaced with simpler electro-mechanical system | cost |
| More reliable solid state solution -vs- mechanical | reliability |
| Easier to manufacture and assemble, less complex | cost |

Fuel Economy:
    The purpose of a DCT is to get manual transmission type efficiencies with automatic shifting. The EDCT does that and much more. Idle off, electric launch, hill hold, boost, and electric creep all are more efficient over a conventional DCT.

Mild Hybrid:
    Applicable to RWD as well and capable of more ratios (7 speed, 9 speed, 10 speed)

Cost:
    A lot of expensive hardware is eliminated but there are some add-on costs such as sync motor, more battery capacity, upsized alternator, and all the linear stepper motors and associated hardware
    Pre-selected gears times are much faster
    More flexible shifting sequence—any odd to any even gear and vice-versa (1-4, 1-6, 2-5, 3-6, 4-1, 5-2, 6-3, 6-1)
    More durable, reliable, no more stepper motors getting "lost", no binding of shift forks, no friction material (syncros) to wear out, much more direct actuation of gear clutches
    A big advantage is that the majority of the TGWs complaints from customers are eliminated
        No more roll back on hill
        Precise control in creep mode (linear pedal), easier to park, no more shudder or lurches
        Poor acceleration off the line—electric launch has instant and high torque on demand
        Shudder and launch NVH issues (jerking, grinding)
        Shift flare/shift bump
        Durability and reliability issues The following are parts eliminated by using at least one embodiment of the present invention:
    Synchronizers (cone clutches)
    All associated parts like the block, ball detent, spring
    2 stepper motors (MAM)
    Gear train (3 reductions×2)
    Drums×2
    Shift rods, forks, linkages to drum
    Dog clutches
    One output shaft (instead of two)
    Complexity of gears significantly reduced and less wide
    Engine starter system Also, there are multiple model options based on e-motor sizing and function:

Option I—Base: smallest e-motor with a 50 to 63:1 ratio (power shift replacement option)
    Used for synchronizing the pre-selected gears
    Creep mode (forward and reverse)
    Hill hold Option II—Premium: small to medium sized e-motor (significant improvement in final economy and function over base option)
    Option I+
    Idle off
    Electric launch
    ICE starter—eliminate ICE starter, cost/weight savings All electric reverse—cost savings and enables rock cycling More battery capacity/upsized alternator Option III—Ultimate: medium+ sized motor (20-30 Kw), mild hybrid (with performance and shift quality enhancements)

Option II+

Electric boost (parallel operation, torque on demand)

Shift assist

Regen (this could be an option II function as well)

More battery capacity/upsized alternator

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. An electronic, high-efficiency, vehicular transmission comprising:
   first and second input shafts and a transmission output shaft;
   a first group of forward gears supported on the first input shaft for rotation therewith;
   a second group of forward gears supported on the second input shaft for rotation therewith;
   a third group of forward gears which correspond to the first and second groups of forward gears and which connect with the output shaft;
   an electric motor having an output shaft connecting with the input shafts for changing angular velocity of the input shafts in response to an electrical signal during a shift to obtain a desired transmission ratio;
   a non-friction, controllable, first coupling assembly having a first coupling state for coupling the electric motor to the first input shaft and a second coupling state for coupling the electric motor to the second input shaft, the first coupling assembly being non-hydraulically controlled to change state; and
   at least one non-friction, controllable, second coupling assembly, each second coupling assembly having a first coupling state for coupling an input target gear on one of the input shafts to an output target gear on the transmission output shaft and a second coupling state for uncoupling the target gears, each second coupling assembly being non-hydraulically controlled.

2. The transmission as claimed in claim 1, wherein the motor synchronizes shifts between transmission ratios.

3. The transmission as claimed in claim 1, wherein the transmission has a creep mode and wherein the motor provides torque during the creep mode.

4. The transmission as claimed in claim 1, wherein the transmission has a reverse mode and wherein the motor provides torque in the reverse mode.

5. The transmission as claimed in claim 1, wherein the transmission has a launch mode and wherein the motor provides torque in the launch mode.

6. The transmission as claimed in claim 1, wherein the motor is utilized in idle-off operations in response to a control signal.

7. The transmission as claimed in claim 1, further comprising a non-friction, controllable, third coupling assembly connecting with the transmission output shaft and having a first coupling state for allowing forward vehicular movement and a second coupling state for grounding reverse vehicular movement.

8. The transmission claimed in claim 1, wherein the motor is utilized for regenerative braking in response to a control signal.

9. The transmission as claimed in claim 1, wherein the motor is utilized in a torque boost operation.

10. The transmission as claimed in claim 1, wherein the transmission is an electronically-controlled, dual clutch transmission.

11. The transmission as claimed in claim 1, further comprising a synchronizing shaft coupled to the output shaft of the motor.

12. The transmission as claimed in claim 11, further comprising a gear train coupling the output shaft of the motor to the synchronizing shaft.

* * * * *